US005689157A

United States Patent [19]

Jitsukata et al.

[11] Patent Number: 5,689,157

[45] Date of Patent: Nov. 18, 1997

[54] CATHODE-RAY TUBE DISPLAY UNIT IN WHICH UNWANTED RADIANT ELECTRIC FIELD FROM FACE PLATE OF CATHODE-RAY TUBE IS DECREASED

[75] Inventors: Hiroshi Jitsukata; Katsuyuki Kawakami; Soichi Sakurai, all of Yokohama; Hiroshi Yoshioka, Mobara; Yoshio Satoh, Chiba-ken, all of Japan

[73] Assignee: Hitachi, Ltd., Tokyo, Japan

[21] Appl. No.: 544,923

[22] Filed: Oct. 18, 1995

Related U.S. Application Data

[63] Continuation-in-part of Ser. No. 460,110, Jun. 2, 1995, which is a continuation of Ser. No. 26,757, Mar. 5, 1993, Pat. No. 5,475,287.

[30] Foreign Application Priority Data

| | | | |
|---|---|---|---|
| May 8, 1992 | [JP] | Japan | 4-115895 |
| Aug. 7, 1992 | [JP] | Japan | 4-211209 |
| Oct. 19, 1994 | [JP] | Japan | 6-253208 |
| Dec. 7, 1994 | [JP] | Japan | 6-303808 |

[51] Int. Cl.[6] ..... G09G 1/04; H01J 29/06; H04N 5/65

[52] U.S. Cl. ..... 315/370; 315/8; 315/85; 348/820

[58] Field of Search ..... 315/8, 85, 370; 313/479; 348/818, 819, 820

[56] References Cited

U.S. PATENT DOCUMENTS

| | | | |
|---|---|---|---|
| 5,151,635 | 9/1992 | Cappels | 315/370 |
| 5,198,729 | 3/1993 | Powell | 315/370 |
| 5,218,270 | 6/1993 | Haapakoski | 315/85 |
| 5,231,332 | 7/1993 | Beaumont et al. | 315/85 |
| 5,449,975 | 9/1995 | Madsen | 315/85 |

FOREIGN PATENT DOCUMENTS

| | | |
|---|---|---|
| 30498589 | 8/1992 | European Pat. Off. . |
| 5-283020 | 10/1993 | Japan . |
| WO9310537 | 5/1993 | WIPO . |

OTHER PUBLICATIONS 9.1 Cancellation of ELF/VLF Electric Fields from CRt Displays, R.D. Cappels, Apple Computer, Inc., Santa Clara, CA., SID 92 Digest, pp. 137–140.

*Primary Examiner*—Gregory C. Issing
*Attorney, Agent, or Firm*—Antonelli, Terry, Stout & Kraus, LLP.

[57] ABSTRACT

A cathode-ray tube display unit provided with a high voltage transformer for supplying high voltage to an anode of a cathode-ray tube, a deflection yoke having a horizontal deflection coil and a vertical deflection coil, and an interior conductive coating formed on the inside of a glass vessel of the cathode-ray tube, in which there is provided an electrode in the conductive coating form formed on an external wall face of a glass vessel at a funnel portion being electrically separated from an exterior graphite coating formed on an external surface of the cathode-ray tube and connected to ground, and a circuit for applying reverse pulse voltage $V_1$ that satisfies $(V_0 \times C_0) > (V_1 \times C_1)$ to the electrode in the conductive coating form is included. Where, it is assumed that flyback pulse voltage supplied to the deflection yoke means is $V_0$, reverse pulse voltage having a polarity reverse to that of voltage generated in the interior conductive coating is $V_1$, electrostatic capacity between the horizontal deflection coil and the interior conductive coating is $C_0$, and electrostatic capacity between the electrode in the conductive coating form and the interior conductive coating is $C_1$.

19 Claims, 15 Drawing Sheets

CATHODE-RAY TUBE DISPLAY UNIT IN WHICH UNWANTED RADIANT ELECTRIC FIELD FROM FACE PLATE OF CATHODE-RAY TUBE IS DECREASED

CROSS REFERENCE TO RELATED APPLICATIONS

The present application is a continuation-in-part of: a) copending U.S. patent application Ser. No. 08/460,110 filed on Jun. 2, 1995 entitled "CATHODE-RAY TUBE APPARATUS AND YOKE", by N. OKUYAMA et al which is a continuation application of b) U.S. Pat. No. 5,475,287 filed on Mar. 5, 1993 entitled "CATHODE-RAY TUBE APPARATUS AND YOKE", by N. OKUYAMA et al.

The contents of U.S. patent application Ser. No. 08/460,110 and U.S. Pat. No. 5,475,287 are incorporated herein by reference.

BACKGROUND OF THE INVENTION

The present invention relates to an image display unit using a cathode-ray tube, and more particularly to a cathode-ray tube display unit having a mechanism for controlling an alternating electric field radiated frontward from a screen of a cathode-ray tube.

A cathode-ray tube display unit is composed of a high-frequency signal processing circuit, a deflection magnetic field generating circuit for an electron beam, a high-voltage generating circuit or the like. Thus, there is a possibility that unwanted electric wave, magnetic field, electric field or the like is radiated. Therefore, various regulations for controlling such unwanted radiations are made in world nations. Further, since the opportunity of using a cathode-ray tube display unit for a long period of time has been increased recently as personal computers or the like spread, particularly an influence exerted on the body of an operator by a low-frequency electric field radiated from an apparatus has started to be apprehended, and regulations related to a value of an alternating electric field radiated from an image display unit (unwanted radiant electric field) are enacted. The alternating electric field is classified into two types depending on a frequency band, and an alternating electric field having a frequency of 2 kHz to 400 kHz is referred to as a Very Low frequency Electric Field (VLEF), and an alternating electric field having a frequency of 5 Hz to 2 kHz is referred to as an Extremely Low frequency Electric Field (ELEF).

As standards related to unwanted radiated electric field from an image display unit, for example, MPR-2 enacted in Sweden in 1990 is well known. A TCO guide line in which MPR-2 standards are intensified strictly has been enacted thereafter, and the necessity for improving the control effects of the alternating electric field further than the present state has been increased. According to the TCO guide line, an electric field value 1.0 [V/m] or below (30 cm in front of and 50 cm around the display unit) with respect to the VLEF in a band of 2 kHz to 400 kHz, and an electric field value 10 [V/m] or below (only 30 cm in front of the display unit) with respect to the ELEF in a band of 5 Hz to 2 kHz are specified, respectively.

In the case of a cathode-ray tube display unit, it is possible to control an alternating electric field value to a regulated value or lower comparatively simply at the portion except an image display face (the front) by electrostatic shielding with a metal plate or the like. However, it is impossible to shield the front of a cathode-ray tube with an opaque metal plate since an image is displayed there. Therefore, as described in JP-A-5-283020, a conductive layer is formed at a neck portion from a funnel portion of a cathode-ray tube and conductive coating is grounded electrically, thereby to shield an alternating electric field emitted from a deflection yoke so as to control an alternating electric field VLEF radiated from a cathode-ray tube display unit in some units.

However, there has been such a problem in a prior art that control of the alternating electric field VLEF is insufficient and the alternating electric field ELEF generated by a different cause of generation cannot be controlled effectively. Namely, the alternating electric field ELEF is an alternating electric field generated by a cause that a beam current is changed by the contents of an image regenerated by DC high voltage supplied from a high voltage circuit to a cathode-ray tube, thus producing dynamic voltage fluctuation, and a countermeasure with the prior art has been insufficient.

SUMMARY OF THE INVENTION

It is an object of the present invention to provide a cathode-ray tube display unit in which two types of alternating electric fields VLEF and ELEF emitted from the front of a cathode-ray tube display unit are controlled effectively by applying voltage for canceling unwanted fluctuation voltage generated in an interior conductive coating to the interior conductive coating through electrostatic capacity.

In order to achieve the above-mentioned object, the present invention provides an electrode (hereinafter described as a funnel electrode) at a portion where there is no exterior graphite coating being in contact with an external wall of a glass vessel of a cathode-ray tube. Reverse pulse voltage (amplitude $V_1$) having a polarity inverted from that of pulse voltage (amplitude $V_0$) supplied to a horizontal deflection coil is applied to the funnel electrode described above. It is assumed that electrostatic capacities between the interior conductive coating of the cathode-ray tube and the horizontal deflection coil, and between the interior conductive coating and the above-mentioned funnel electrode are $C_0$ and $C_1$, respectively, and it is arranged so that a voltage value of ($V_0 \times C_0$) becomes larger than a voltage value of ($V_1 \times C_1$).

Furthermore, a transparent conductive coating having a resistance value per unit area at $2 \times 10^6$ [Ω/sq.] or below is provided on an external surface of a face plate and is connected to ground.

As another structure for applying reverse pulse voltage, according to the present invention, a flyback pulse generated in a horizontal deflection coil is applied to a primary winding of a transformer connected to the coil, thereby to generate a reverse pulse having a polarity inverted from that of the flyback pulse is generated in a secondary winding of the transformer. Then, for example, the unit is structured so that the reverse pulse is supplied to one end of a capacitor contained in a high voltage transformer and connected to a high voltage terminal at the other end, and the reverse pulse is applied to an interior conductive coating of a cathode-ray tube through an anode cable.

Further, a secondary winding of a transformer for generating a first reverse pulse having a polarity inverted from that of a flyback pulse produced in a horizontal deflection coil and an auxiliary winding of a high voltage transformer for generating a pulse generated during a flyback period, i.e., a second reverse pulse having a polarity inverted from that of a residual pulse remaining in a high voltage line at a high voltage terminal of the high voltage transformer are connected with each other, thus generating voltage obtained by adding and synthesizing first and second reverse pulses. Further, the unit is structured so that the added and synthesized reverse pulse is supplied to one end of a capacitor connected to a high voltage terminal or an anode cable at the other end, and the synthesized reverse pulse is applied to an interior conductive coating of a cathode-ray tube.

In accordance with this structure, alternating voltage which is originated in pulse voltage supplied to a deflection yoke and has been generated in an interior conductive coating of a cathode-ray tube by electrostatic coupling is canceled by pulse voltage generated in the interior conductive coating with reverse pulse voltage applied to the funnel electrode, thereby to reduce the amplitude of alternating voltage which has been generated in the interior conductive coating. Thus, it is possible to reduce the alternating electric field VLEF caused by dynamic voltage fluctuation (alternating voltage) produced in the interior conductive coating. Furthermore, by shielding the alternating electric field ELEF with a transparent conductive coating which has been formed on the external surface of the face plate and connected to ground, two types of alternating electric fields VLEF and ELEF which have been emitted from the front of the cathode-ray tube display unit are controlled effectively.

DESCRIPTION OF THE PREFERRED EMBODIMENTS

Figure 1:
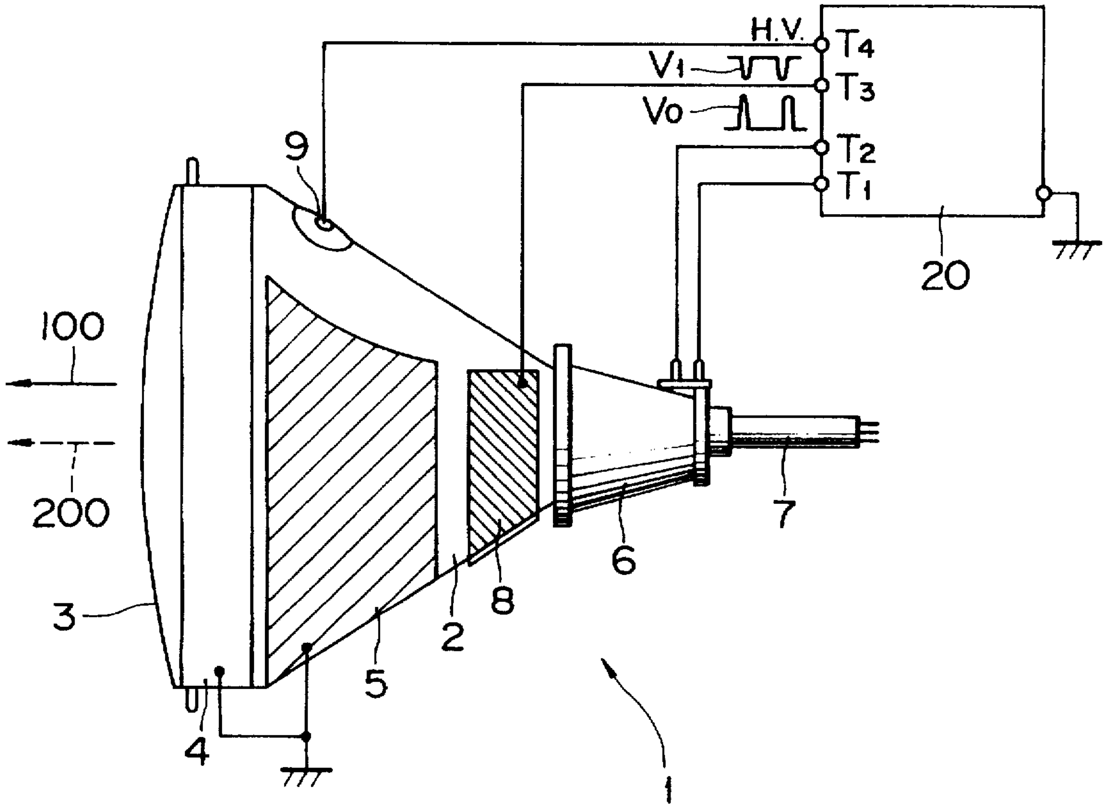
FIG. 1 is a view showing a structure of an embodiment of a cathode-ray tube display unit according to the present invention.
Figure 2:
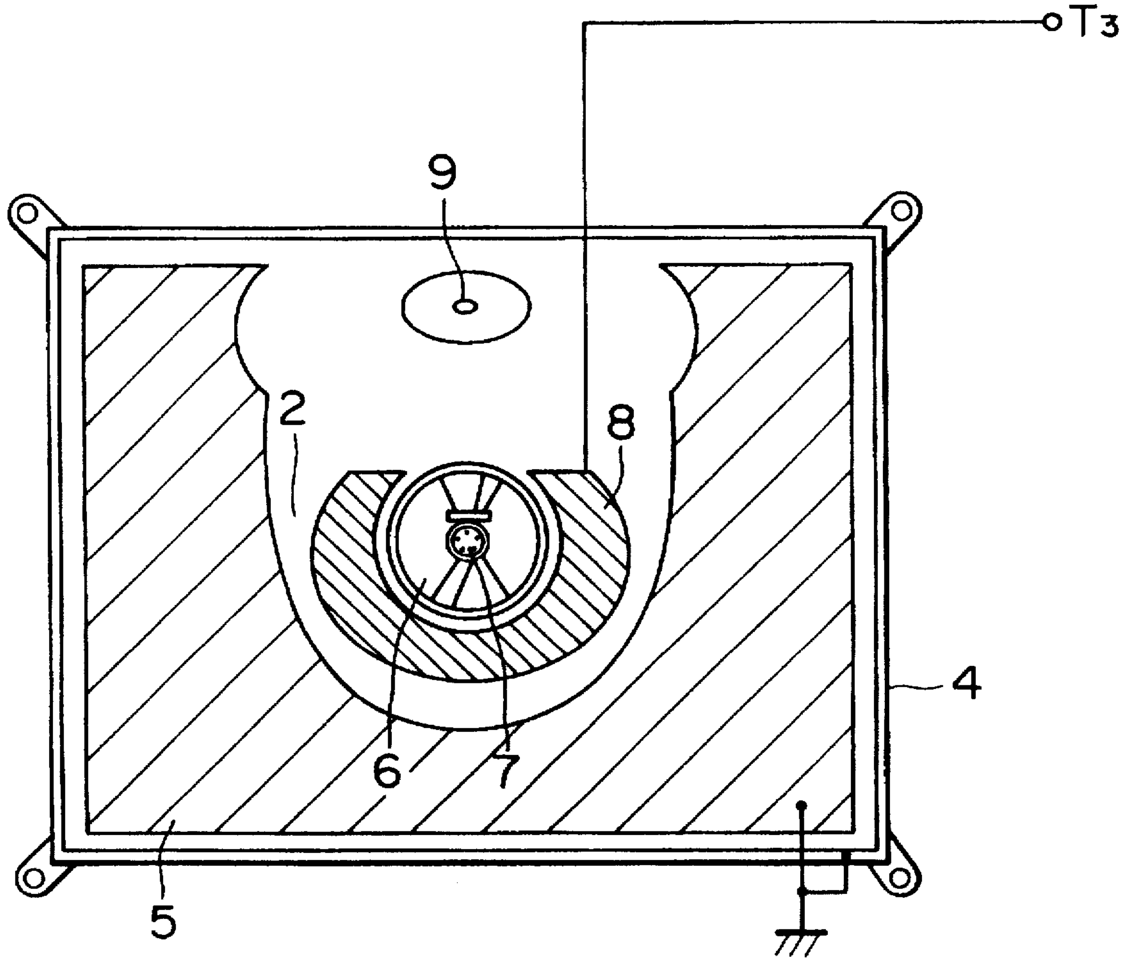
FIG. 2 is a view seen from a side of a neck of the cathode-ray tube display unit shown in FIG. 1.

Embodiments of the present invention will be explained hereinafter with reference to the drawings. FIG. 1 is an explanatory view showing a principal part of a first embodiment of a cathode-ray tube display unit according to the present invention from the side thereof, FIG. 2 is an explanatory view showing a cathode-ray tube from the rear, and FIG. 3 shows a sectional view of alternating electric field radiated from a cathode-ray tube device.

In FIG. 1, a cathode-ray tube 1 consists roughly of three glass vessels, and is composed of a face plate portion 3, a funnel portion 2 and a neck portion 7. At least the face plate 3 is provided with a fluorescent plane obtained by applying a phosphor (not shown) to the inside of transparent glass. The funnel portion 2 is an almost cone-shaped glass vessel, and is provided at least with an anode button 9 for applying high voltage (hereinafter abbreviated as H.V.) from a high voltage deflection circuit 20, an exterior graphite coating 5 and a funnel electrode 8. The exterior graphite coating 5 is obtained by applying an aqueous solution of graphite which is an electrical conductor to a part of the external wall of the glass vessel of the funnel 2 and drying it. The exterior graphite coating 5 is connected electrically to ground so as to add electrostatic capacity to an anode of the cathode-ray tube 1. An electron gun (not shown) for generating an electron beam is sealed in the neck portion 7, and at least a deflection yoke 6 is installed from the outside thereof. The deflection yoke 6 installed on the neck portion 7 consists of a horizontal deflection coil and a vertical deflection coil for generating deflection magnetic field for deflecting an electron beam horizontally and vertically so as to obtain a raster. Besides, a metal band (an explosion-proof band) 4 for increasing safety when the glass vessel of a cathode-ray tube is damaged is wound around the side portion of the face plate 3, and is used by connecting it electrically to ground.

Figure 3A:
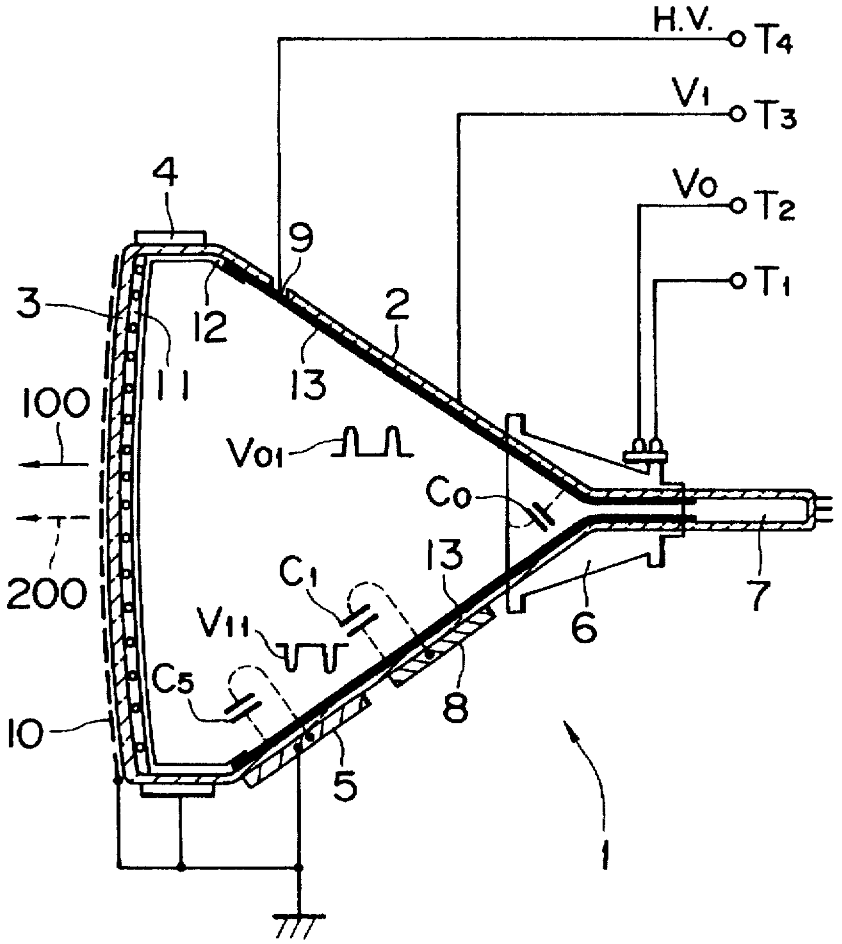
FIG. 3A is a sectional block diagram of an embodiment of a cathode-ray tube display unit according to the present invention.

As shown in FIG. 3A, an inner layer conductive coating 13 in which conductive graphite is applied is formed on the inside of the funnel 2, and D.C. voltage at several ten thousand [V] is supplied thereto from a terminal $T_4$ of a high voltage deflection circuit 20 through the anode button 9. On the other hand, a phosphor that emits light by irradiation with an electron beam is applied to the inside of the face plate 3 so as to form a fluorescent film 11, and electric connection is made with a metal-back film 12 obtained by vaporizing aluminum so that the fluorescent film 11 and the interior conductive coating 13 show the same potential.

Besides, although it is not illustrated, a color selecting electrode such as a shadow mask for selecting color phosphors in three primary colors is provided near by the fluorescent film 11 so that it shows the same potential as that of the interior conductive coating 13 in the case of a color cathode-ray tube. In order to reduce fluctuation (ripple) of high voltage supplied from the terminal $T_4$, the exterior graphite coating 5 is connected to ground, and electrostatic capacity $C_5$ of approximately several thousands [pF] is formed between the exterior graphite coating 5 and the interior conductive coating 13 through the funnel glass and used as the smoothing capacity of the high voltage circuit 20. There is provided a funnel electrode 8 that constitutes a principal part of the present invention between the grounded exterior graphite coating 5 and the deflection yoke 6. That in which a conductive coating film is formed on the external surface of the glass face of the funnel 2, that in which a metal foil (such as a copper foil having a thickness of approximately 35 μm) with a binder is stuck to the glass external wall, or that in which water soluble graphite is applied and dried can be used for the funnel electrode 8, in which an electrode is provided in contact with the external wall of the glass vessel at the funnel portion.

Figure 3B:
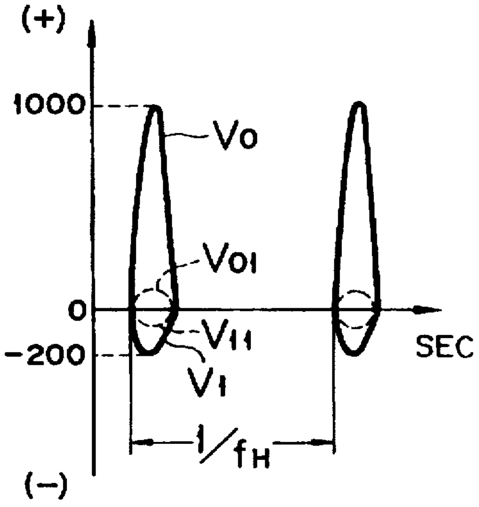
FIG. 3B is a diagram showing the relationship among a horizontal deflection pulse $V_0$, pulse voltage $V_{01}$ generated in an interior conductive coating by the pulse $V_0$, and reverse pulses $V_1$ and $V_{11}$ for canceling the pulse voltage $V_{01}$.

The horizontal deflection coil of the deflection yoke 6 is connected to terminals $T_1$ and $T_2$ of the high voltage deflection circuit 20 shown in FIG. 1, and pulse voltage $V_O$ of approximately 1,000 [$V_{p\text{-}p}$] that repeats at a horizontal deflection period (hereinafter abbreviated as H period. The period is a reciprocal number of a horizontal deflection frequency $f_H$.) such as shown in FIG. 3B is supplied from $T_2$. A sawtooth current of a horizontal period is generated in the horizontal deflection coil by pulse voltage $V_O$, thereby to generate a horizontal deflection magnetic field that deflects an electron beam from side to side. On the other hand, reverse pulse voltage $V_1$ that has a similar figure to the pulse voltage $V_O$ at the terminal $T_2$ and a polarity inverted from that of $V_O$ is generated at the terminal $T_3$ of the high voltage deflection circuit 20, and the voltage $V_1$ is supplied to the funnel electrode 8.

Since the alternating electric field radiated while the cathode-ray tube device 1 is in operation has been analyzed, thereby to clarify a generating mechanism thereof, the mechanism will be explained here. Principal causes of generating the alternating electric field are attributed to dynamic voltage fluctuation (alternating voltage) produced in the inner layer conductive coating 13 of the cathode-ray tube, and two types of alternating electric fields VLEF 100 and ELEF 200 are emitted frontward through the glass face of the face plate 3 when the cathode-ray tube device 1 is in operation. Furthermore, the causes for generating the alternating electric fields VLEF 100 and ELEF 200 and a countermeasure by the present invention will be described in detail with reference to FIGS. 3A, 3B and 3C and FIG. 4.

The VLEF 100 in a frequency band of 2 kHz to 400 kHz is an alternating electric field of H period originated in the pulse voltage $V_O$ supplied to the deflection yoke 6. On the other hand, the ELEF 200 in a frequency band of 5 Hz to 2 kHz is an alternating electric field caused by a fact that an electron beam quantity emitted from the electron gun of the cathode-ray tube 1 is changed in accordance with the contents of a video signal and dynamic voltage fluctuation (abbreviated as ΔHV) in a vertical deflection period (hereinafter abbreviated as V period. The period is a reciprocal number of a vertical deflection frequency $f_V$.) is generated by H.V. supplied to the anode of the cathode-ray tube 1. (See FIG. 3C.)

First, the mechanism that VLEF 100 is radiated from the face plate 3 and the principle of controlling the alternating electric field 100 will be described in detail. Pulse voltage $V_{O1}$ (FIG. 3B) analogous to the pulse voltage $V_O$ supplied from the terminal $T_2$ is generated in the interior conductive coating 13 by electrostatic coupling between the horizontal deflection coil of the deflection yoke 6 and the interior conductive coating 13 (distributed capacity is expressed as equivalent electrostatic capacity $C_O$ in FIG. 3A).

Figure 4:
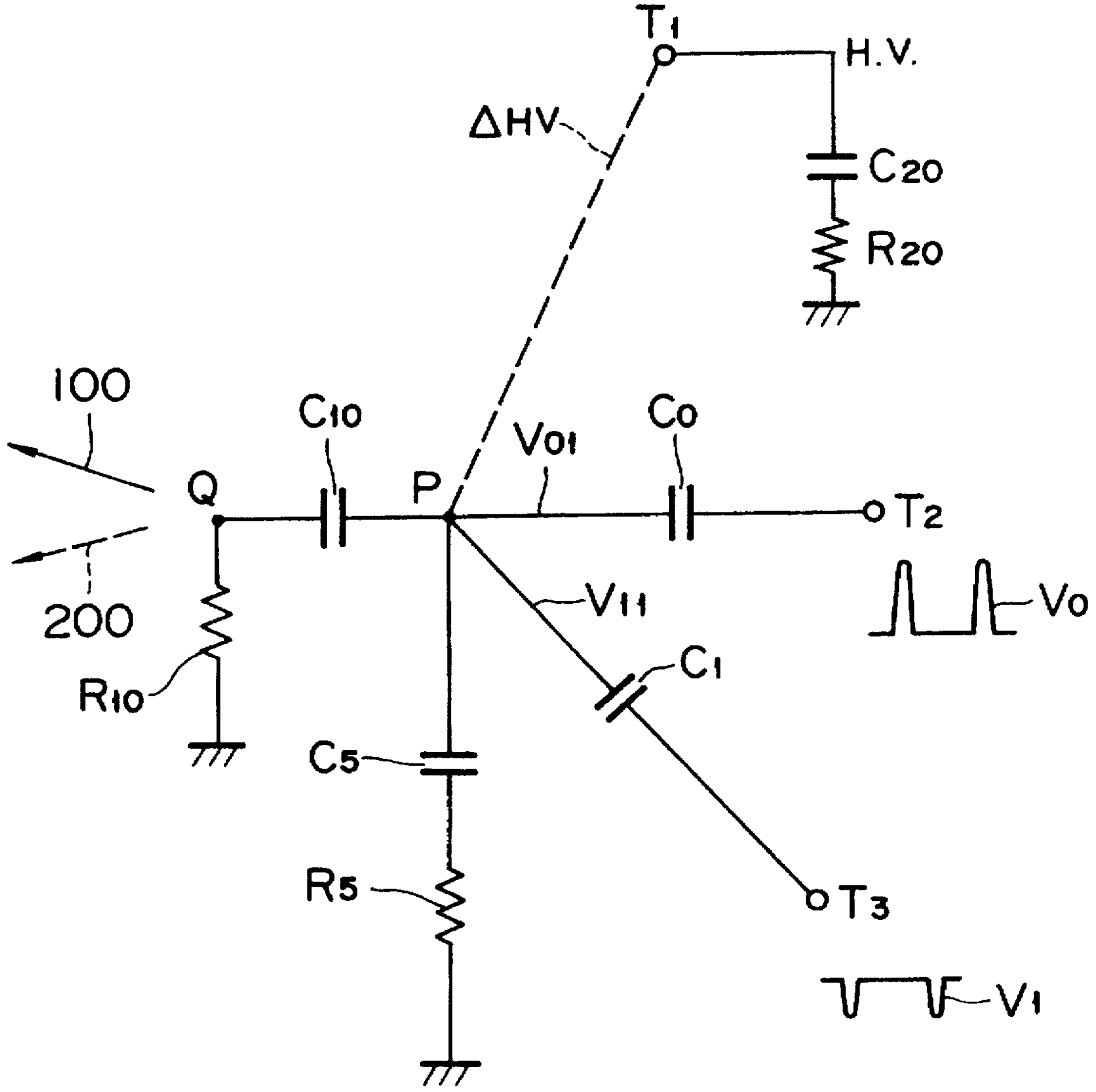
FIG. 4 is an equivalent circuit diagram of a cathode-ray tube display unit according to the present invention.

Similarly, pulse voltage $V_{11}$ (FIG. 3B) analogous to the reverse pulse voltage $V_1$ supplied to the funnel electrode 8 from the terminal $T_3$ is generated between the funnel electrode 8 and the interior conductive coating 13 by electrostatic coupling between the funnel electrode 8 and the interior conductive coating 13 (equivalent electrostatic capacity is expressed as $C_1$ in FIG. 3A). FIG. 4 shows an equivalent circuit for explaining connected states of electrostatic capacities $C_O$, $C_1$ or the like, and a point P corresponds to the interior conductive coating 13. $C_5$ represents electrostatic capacity between the exterior graphite coating 5 and the interior conductive coating 13, $R_5$ represents resistance of the exterior graphite coating 5, $C_{10}$ represents electrostatic capacity between a transparent conductive coating 10 (expressed with a point Q) formed on the surface of the face plate 3 and the interior conductive coating 13, and $R_{10}$ represents the resistance of the transparent conductive coating 10. Besides, $C_{20}$ and $R_{20}$ represent internal capacity and protective resistance of a flyback transformer (FBT) of the high voltage deflection circuit 20.

When dynamic voltage change (alternating voltage) is generated in the interior conductive coating 13, the alternating voltage is generated in the transparent conductive coating 10 formed on the surface of the face plate 3 through the capacity $C_{10}$. The alternating voltage generated at the point Q generates voltage amplitude in accordance with a ratio of impedance division of the electrostatic capacity $C_{10}$ and the resistance $R_{10}$ in the transparent conductive coating 10, and radiates the alternating electric fields VLEF 100 and ELEF 200 frontward from the face plate 3. Accordingly, when the resistance value $R_{10}$ of the transparent conductive coating 10 can be made sufficiently small, thereby to make the shielding effect larger, the alternating voltage generated at the point Q becomes smaller, thus making it possible to control the alternating electric field to a small value.

Figure 5A:
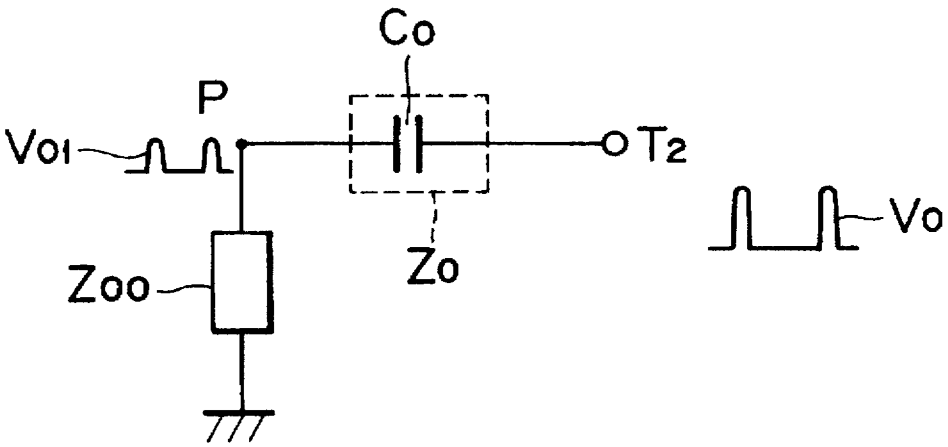
FIG. 5A is an explanatory diagram of alternating voltage generated in an interior conductive coating.

Now, as described previously, the cause of generating the alternating electric field VLEF 100 is attributed to a fact that alternating voltage $V_{O1}$ analogous to the pulse voltage $V_O$ supplied to the terminal $T_2$ is generated in the interior conductive coating 13 due to the existence of the electrostatic capacity $C_O$. When it is assumed as shown in FIG. 5A that synthetic impedance between the point P and the ground is $Z_{OO}$ and the impedance of $C_O$ is $Z_O$, the alternating voltage $V_{O1}$ at the point P in FIG. 4 is expressed with the following expression, and is approximated with Expression 1 since $Z_{OO} \ll Z_O$.

[Expression 1]

$$\begin{aligned} V_{01} &= \frac{Z_{00}}{Z_{00}+Z_0} V_0 \\ &= \frac{Z_{00}}{Z_0\left(1+\frac{Z_{00}}{Z_0}\right)} V_0 \\ &\approx \frac{Z_{00}}{Z_0} V_0 \left(\because 1 >> \frac{Z_{00}}{Z_0}\right) \\ &= \frac{Z_{00}}{\frac{1}{\omega C_0}} V_0 \left(Z_0 = \frac{1}{\omega C_0}\right) \\ &= \omega Z_{00}(C_0 \times V_0) \\ &\propto (C_0 \times V_0) \end{aligned}$$

It is comprehended from the Expression 1 that the amplitude of the generated voltage $V_{01}$ is proportioned to a product ($C_0 \times V_0$) of electrostatic capacity $C_0$ of the horizontal deflection coil and the pulse voltage $V_0$ supplied to the horizontal deflection coil.

Figure 5B:
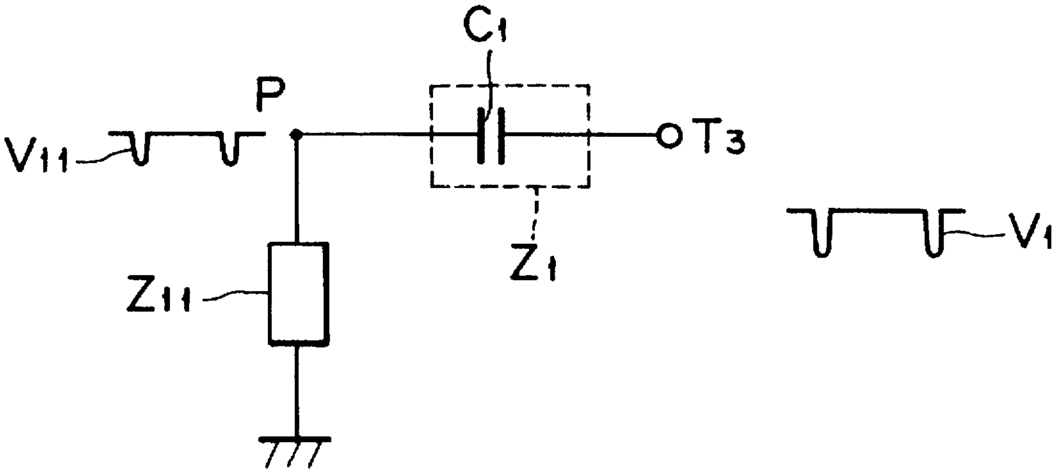
FIG. 5B is an explanatory diagram of reverse voltage for canceling alternating voltage generated in an interior conductive coating.

Similarly, alternating voltage $V_{11}$ analogous to the reverse pulse voltage $V_1$ applied to the electrode is generated in the interior conductive coating 13 by the electrostatic capacity $C_1$ of the funnel electrode 8. When it is assumed as shown in FIG. 5B that the synthetic impedance between the point P and the ground is $Z_{11}$, and the impedance of $C_1$ is $Z_1$ at the point P in FIG. 4, the alternating voltage $V_{11}$ at the point P is approximated with Expression 2 since $Z_1 << Z_1$.

[Expression 2]

$$\begin{aligned} V_{11} &= \frac{Z_{11}}{Z_{11}+Z_1} V_1 \\ &= \frac{Z_{11}}{Z_1\left(1+\frac{Z_{11}}{Z_1}\right)} V_1 \\ &\approx \frac{Z_{11}}{Z_1} V_1 \left(\because 1 >> \frac{Z_{11}}{Z_1}\right) \\ &= \frac{Z_{11}}{\frac{1}{\omega C_1}} V_1 \left(Z_1 = \frac{1}{\omega C_1}\right) \\ &= \omega Z_{11}(C_1 \times V_1) \\ &\propto (C_1 \times V_1) \end{aligned}$$

It is comprehended from the Expression 2 that the amplitude of the generated voltage $V_{11}$ is proportioned to a product ($C_1 \times V_1$) of the electrostatic capacity $C_1$ of the funnel electrode and the reverse pulse voltage $V_1$.

Figure 6:
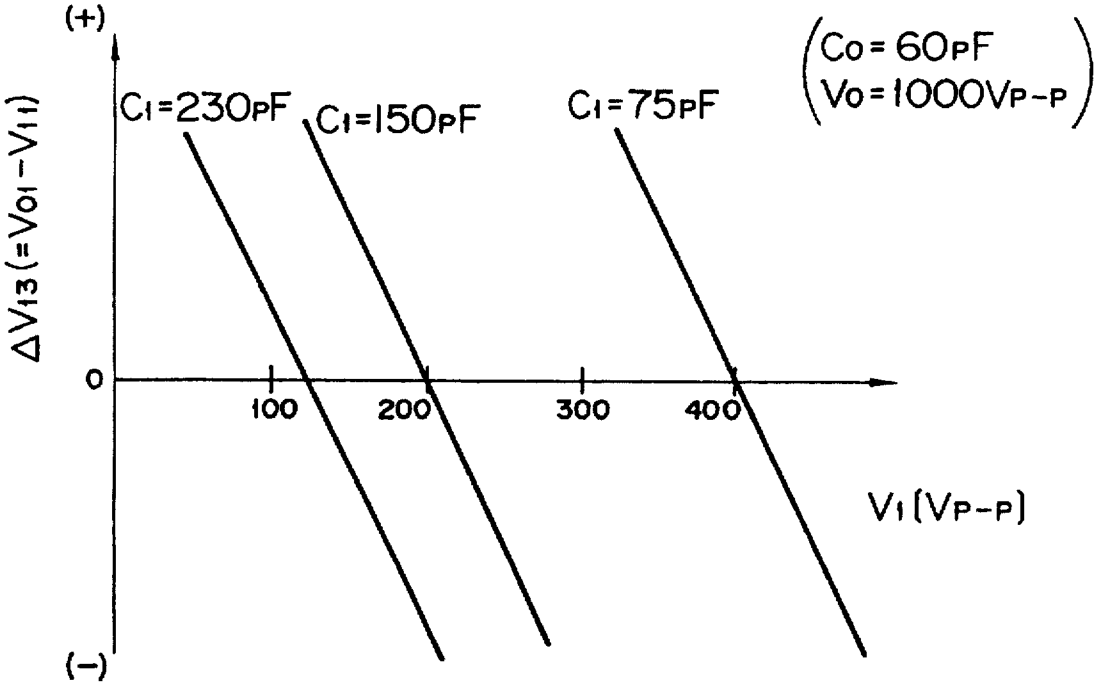
FIG. 6 is a diagram showing the relationship between reverse pulse voltage and alternating voltage generated in an interior conductive coating.
Figure 7:
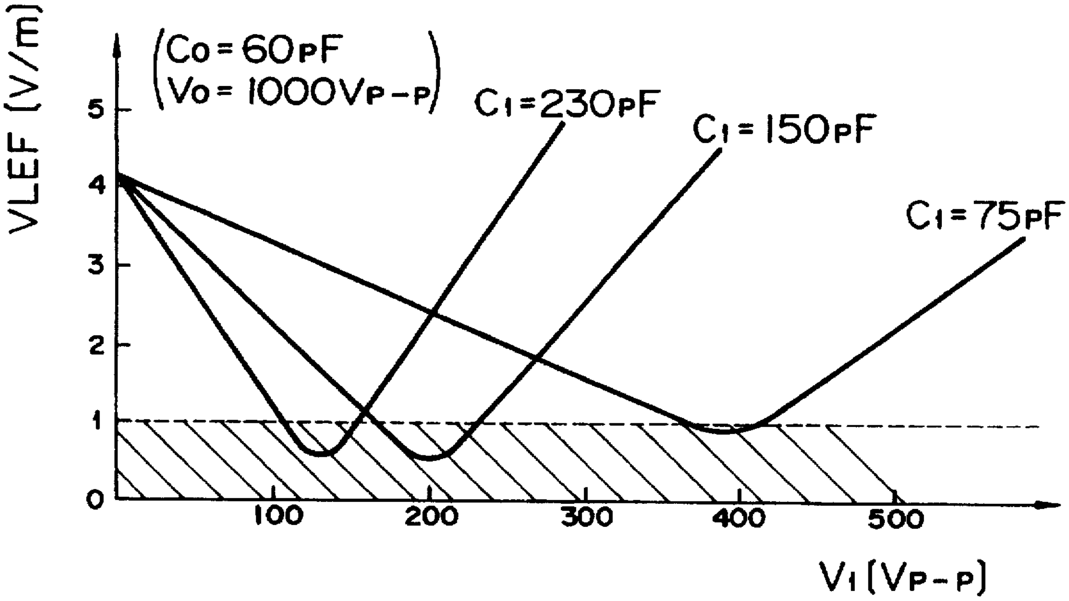
FIG. 7 is a diagram showing the relationship between reverse pulse voltage and alternating electric field VLEF.

By inducing pulse voltage $V_{11}$ analogous to the reverse pulse voltage $V_1$ in the interior conductive coating 13, the alternating voltage $V_{01}$ that has been generated in the interior conductive coating 13 and the alternating voltage $V_{11}$ in which the polarity has been inverted are negated mutually. FIG. 6 shows the result of measuring the amplitude of the alternating voltage $\Delta V_{13}(=V_{01}-V_{11})$ of the interior conductive coating 13 when the area of the funnel electrode 8 is changed so as to change the reverse pulse voltage using the electrostatic capacity $C_1$ of the electrode as a parameter. It is possible to make the alternating voltage $\Delta V_{13}$ that becomes the generating source of VLEF 100 zero by setting the reverse pulse voltage value in an optimum manner in accordance with an electrostatic capacity value of each funnel electrode 8. FIG. 7 shows the results of measuring VLEF by installing a measuring instrument of an alternating electric field (such as EFM 200 manufactured by Combinova Company in Sweden) at a distance of 30 cm from the tube face in front of the cathode-ray tube device 1. It has been confirmed through experiments that there is a one-to-one correspondence between the alternating electric field VLEF radiated from the tube face and the alternating voltage $\Delta V_{13}$ in the interior conductive coating 13 and that the alternating electric field VLEF 100 can be reduced from 4.3 [V/m] before the countermeasure to 0.8 to 0.5 [V/m] after the countermeasure by making the alternating voltage $\Delta V_{13}$ almost zero. Namely, according to the present invention, it is possible to bring the alternating electric field value of VLEF to a TCO guide line (≦1 [V/m]) or lower by setting the electrostatic capacity $C_{11}$ of the funnel electrode 8 and the reverse pulse voltage $V_1$ appropriately, and to improve it to a level that the influence of unwanted radiation electric field on the human body offers no problem.

Now, it has been ascertained as the result of performing experiments while setting the relationship among $C_0$, $V_0$, $C_1$ and $V_1$ at various values that the voltage value of ($V_0 \times C_0$) is always larger than the voltage value of ($V_1 \times C_1$). That is, the following Expression 3 is satisfied.

[Expression 3]

$$(V_0 \times C_0) > (V_1 \times C_1)$$

Further, a value of a constant K has been different depending on the specifications of the winding of the horizontal deflection coil of the deflection yoke 6 used in the experiments in a relational expression shown in Expression 4 with K as a constant.

[Expression 4]

$$K \times (V_0 \times C_0) = (V_1 \times C_1) \qquad \text{[Expression 4]}$$

Table 1 shows values of the constant K computed from the results of experiments with respect to three types of deflection yokes #1, #2 and #3 having different specifications, and K was within the range of 0.1 to 0.9. Besides, the constant K of the deflection yoke #2 of the data shown in FIG. 6 and FIG. 7 was approximately 0.5.

TABLE 1

| Deflection yoke | #1 | #2 | #3 |
|---|---|---|---|
| $C_0$ [pF] | 30 | 60 | 90 |
| $V_0$ [Vp-p] | 1000 | 1000 | 1000 |
| $C_1$ [pF] | 150 | 150 | 150 |
| $V_1$ [Vp-p] | 20 | 200 | 550 |
| Constant-K | 0.1 | 0.5 | 0.9 |

Figure 8:
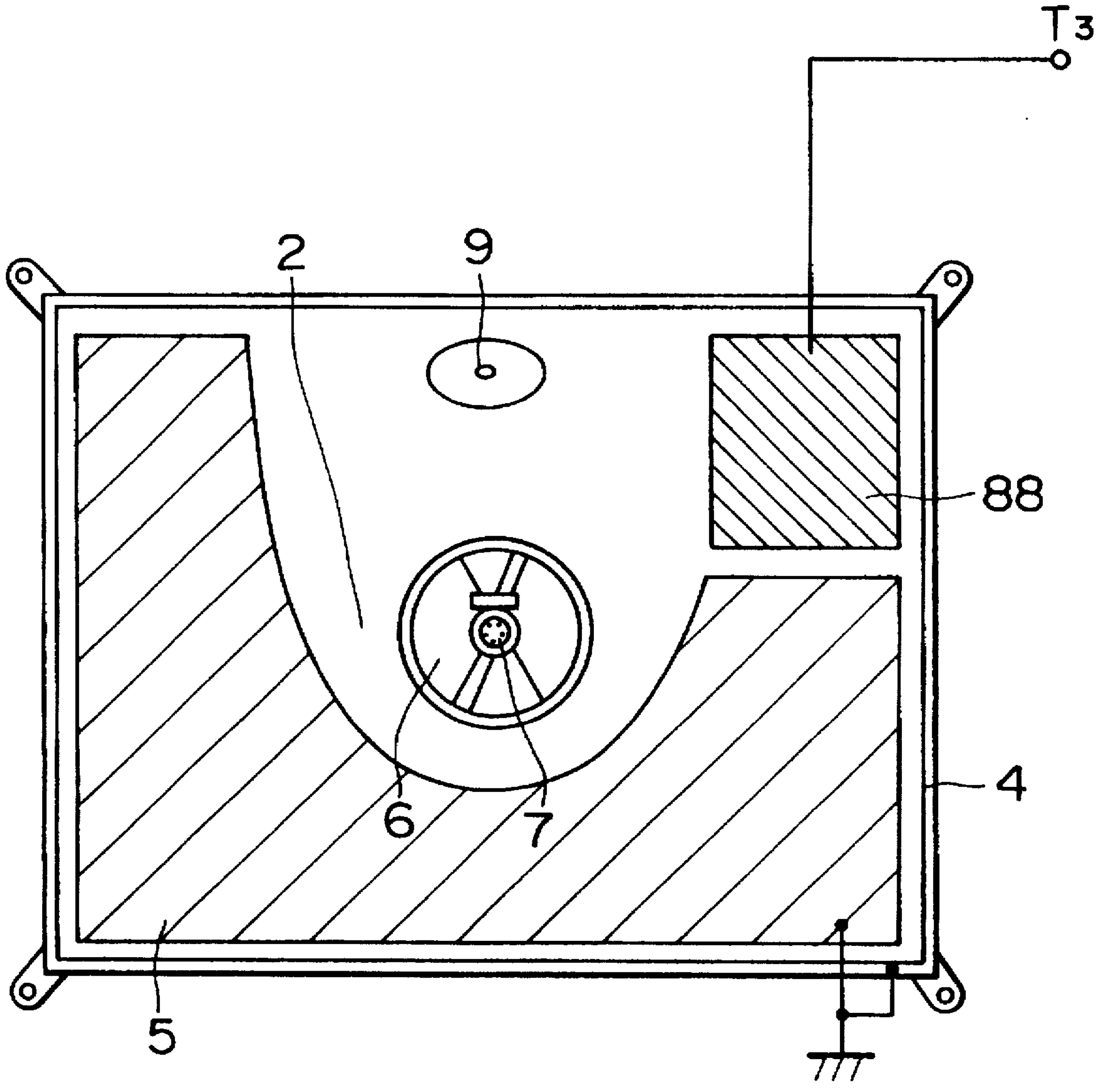
FIG. 8 is a view showing another embodiment of a funnel electrode according to the present invention.

Further, the electrostatic capacity $C_1$ of the funnel electrode 8 can be set depending on the size of the electrode area, and is not related so much to the electrode configuration and the position of installing the electrode. Accordingly, the configuration and installing position of the electrode are not limited to those that are shown in FIG. 1, but, as shown in FIG. 8 for instance, it is possible to arrange a funnel electrode 88 having an optional configuration in the area where no exterior graphite coating 5 exists.

Now, when the area of the exterior graphite coating 5 is made as small as possible, thereby to set the area of the funnel electrode 88 larger ($C_1$ is made larger), it is possible to control the alternating electric field VLEF with low reverse pulse voltage. Conversely, when the area of the funnel electrode 88 is set small ($C_1$ is made small), large reverse pulse voltage is required in order to control the alternating electric field VLEF. Table 2 shows the results of computing reverse pulse voltage $V_1$ and a ratio $R=C_1/C_0$ of electrostatic capacities $C_0$ vs. $C_1$ required when the deflection yoke #2 shown in Table 1 is used and the area of the funnel electrode 88 is changed from the results of experiments. It is understood that the value of the ratio R is between approximately 0.5 and 15.

TABLE 2

| | | | | | | |
|---|---|---|---|---|---|---|
| $C_1$ [pF] | 1000 | 500 | 230 | 150 | 75 | 30 |
| $V_1$ [Vp-p] | 30 | 60 | 130 | 200 | 400 | 1000 |
| $R = C_1/C_0$ | 15 | 8.3 | 3.8 | 2 | 1.3 | 0.5 |

On the other hand, the alternating voltage $V_{01}$ of the interior conductive coating 13 that becomes a generating source of the alternating electric field VLEF 100 is proportioned to the electrostatic capacity $C_0$ as shown in the Expression 1. Thus, since the funnel electrode capacity $C_1$ required for controlling VLEF or the reverse pulse voltage $V_1$ can be made small if $C_0$ can be reduced, it becomes an advantage in executing the present invention. Now, it has been known that electrostatic capacity C of a plane parallel plate capacitor is expressed by Expression 5.

[Expression 5]

$$C=\epsilon S/d \qquad \text{[Expression 5]}$$

where, $\epsilon$ is a dielectric constant between parallel plates;

S is an area of the parallel plates; and d is a distance between parallel plates.

From the Expression 5, it is sufficient to make $\epsilon$ and S smaller and to make d larger on the contrary in order to reduce the electrostatic capacity C. This is applied to the electrostatic capacity $C_0$ between the horizontal deflection coil and the interior conductive coating, and, for example, lead alkali glass (dielectric constant $\epsilon \approx 8.3$) to boro-silicate glass (dielectric constant $\epsilon \approx 5$) having a dielectric constant $\epsilon$ at 8 or less and so on used widely are used as a glass vessel material of the portion opposing to the deflection yoke. Otherwise, the interior conductive coating 13 opposing to the horizontal deflection coil is formed in a mesh shape or the like, and the equivalent area S is reduced by chipping a part thereof. Or, d is increased by increasing the glass vessel thickness (corresponding to d) at the portion opposing to the horizontal deflection coil toward the inside of the vessel. It has been confirmed that it is possible to make the electrostatic capacity $C_0$ to 90 [pF] or less and to control the alternating electric field VLEF with practical values of the area of the funnel electrode and the reverse pulse voltage value that have no problem in point of withstand voltage by using the foregoings independently or jointly.

Figure 9A:
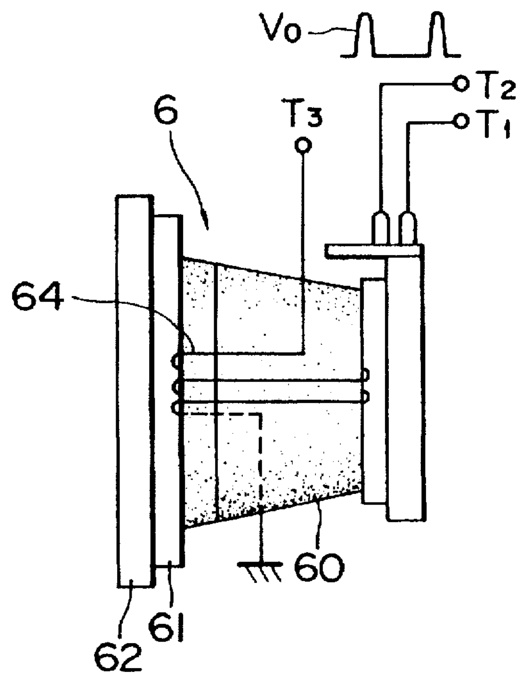
FIGS. 9A and 9B are diagrams showing an embodiment for generating a reverse pulse.
Figure 9B:
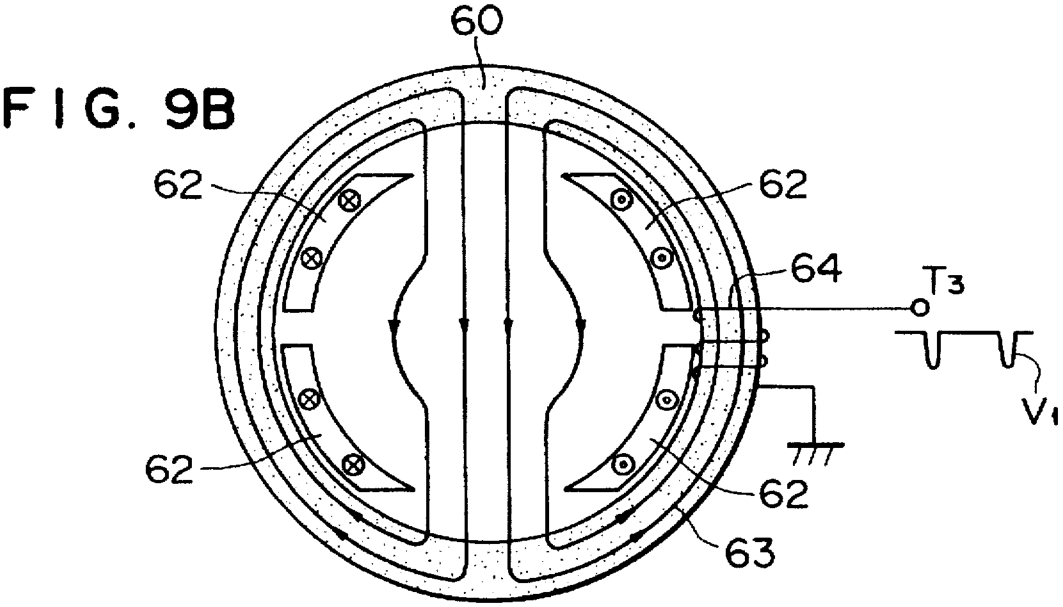

An example of a circuit for generating reverse pulse voltage $V_1$ supplied to the funnel electrode 8 is shown in FIGS. 9A and 9B. FIG. 9A is a side view of the deflection yoke 6, and FIG. 9B is an explanatory diagram for explaining magnetic flux of a core made of a magnetic material. The deflection yoke 6 is provided with a vertical deflection coil 61 (not shown in FIG. 9B) and a horizontal deflection coil 62 on the inside of the core 60 made of a magnetic material. Furthermore, according to the present invention, an auxiliary winding 64 for detecting magnetic flux 63 generated by the horizontal deflection coil 62 is provided in the core portion 60. The horizontal deflection magnetic field 63 interlinks with the auxiliary winding 64, and the reverse pulse voltage $V_1$ is obtainable at a terminal $T_3$.

Figure 10:
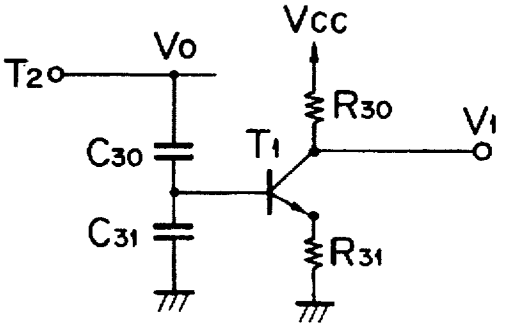
FIG. 10 is a diagram showing another embodiment for generating a reverse pulse.

In another embodiment, as shown in FIG. 10, the pulse voltage detected from the terminal $T_2$ where pulse voltage $V_0$ is applied to the deflection yoke 6 is attenuated so as to show a predetermined amplitude, and pulse voltage inverted by a transistor is supplied thereafter to the funnel electrode 8 as reverse pulse voltage $V_1$ and used to control the alternating electric field VLEF.

Figure 13:
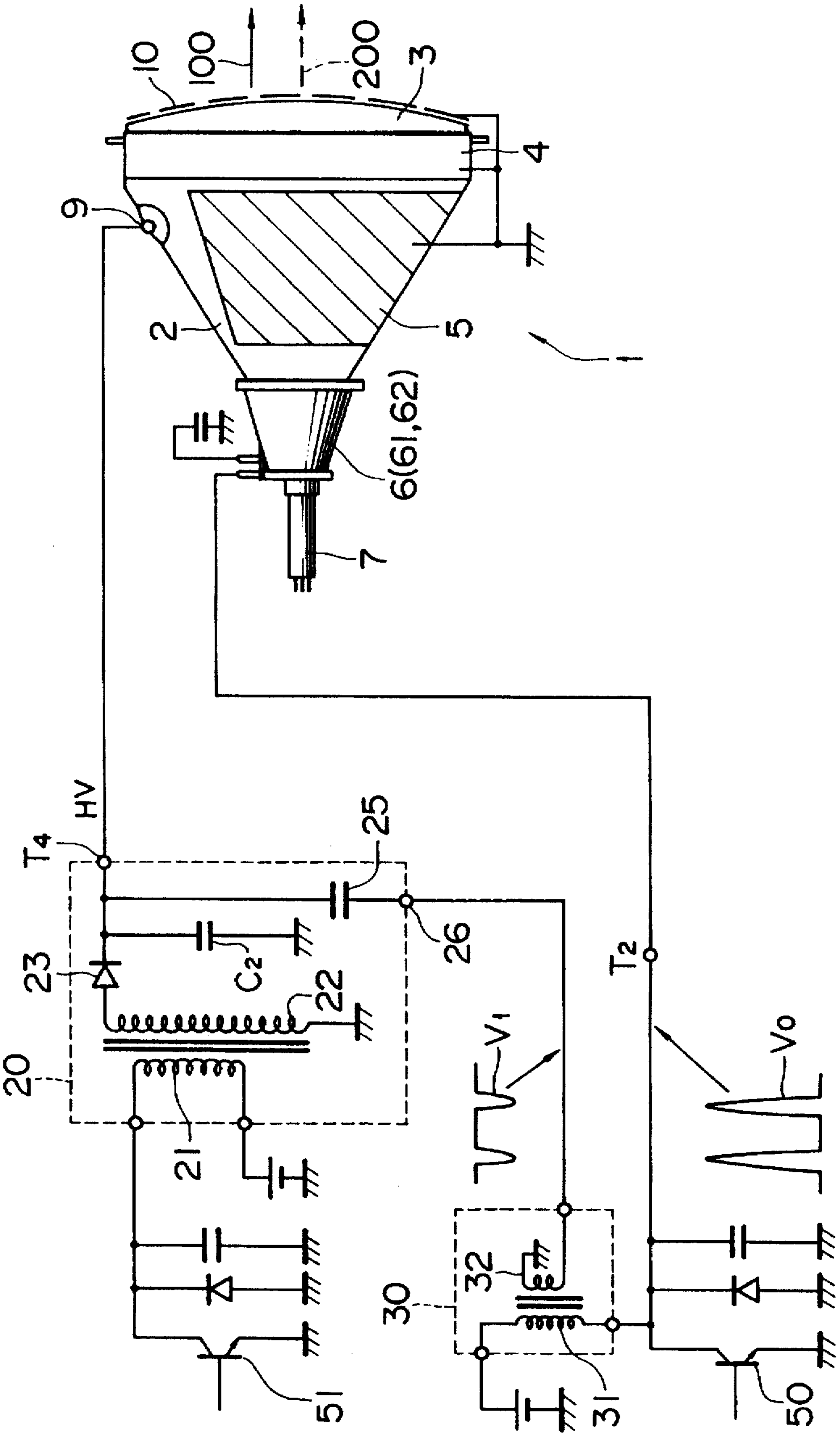
FIG. 13 is a diagram showing another embodiment of a reverse pulse voltage generating circuit according to the present invention.
Figure 15:
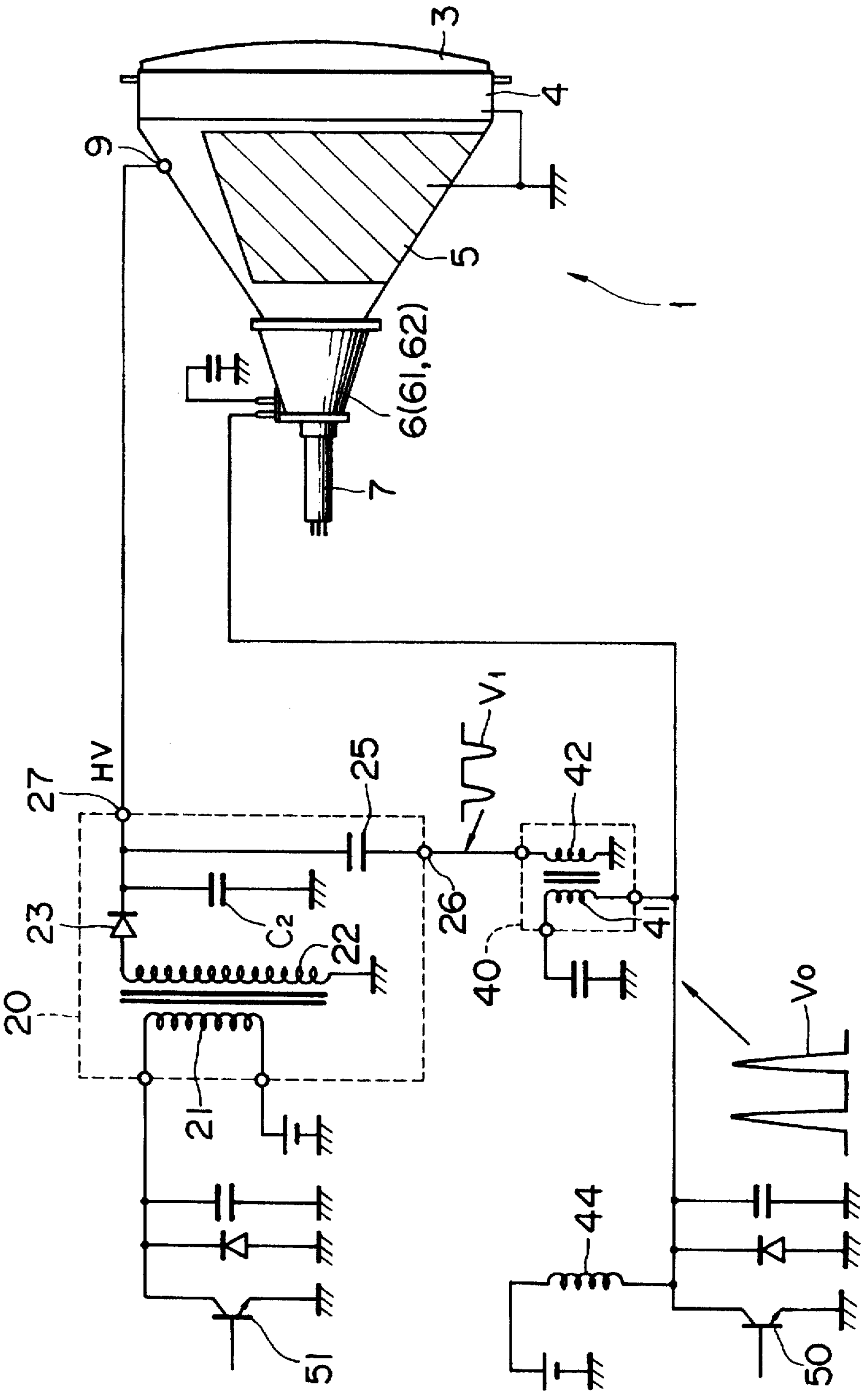
FIG. 15 is a diagram showing another embodiment of a reverse pulse voltage generating circuit according to the present invention.

It is also possible to obtain the reverse pulse voltage from secondary windings 32 and 42 of transformers 30 and 40 shown in FIGS. 13 and 15. Further, it is also possible to use synthetic pulse voltage $V_1+V_3$ shown in FIG. 16 as the reverse pulse voltage. In this case, the obtained reverse pulse voltage is applied to the funnel electrode 8.

When the synthetic pulse $V_1+V_3$ is used, the following relations corresponding to Expressions 3 and 4 are satisfied.

$$(V_0 \times C_0) > ((V_1+V_3) \times C_1)$$

$$K \times V_0 \times C_0 = (V_1+V_3) \times C_1,\ 0.1 \leq k \leq 0.9.$$

Figure 3C:
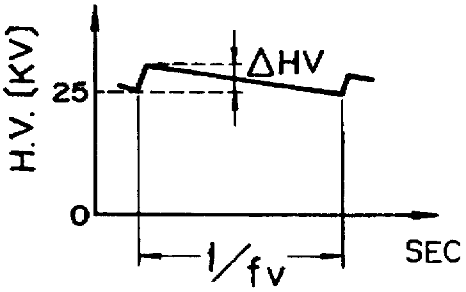
FIG. 3C is a diagram for explaining the cause of generating ELEF.
Figure 11:
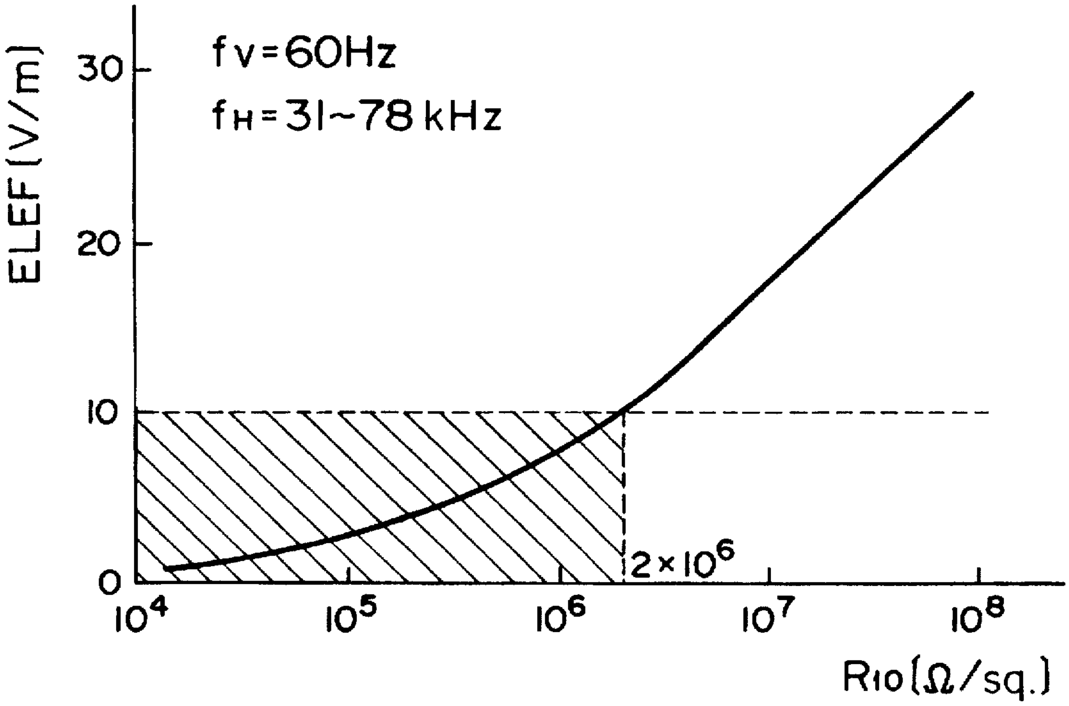
FIG. 11 is a characteristic diagram showing the relationship between a resistance value of a transparent conductive coating and alternating electric field ELEF.
Figure 12:
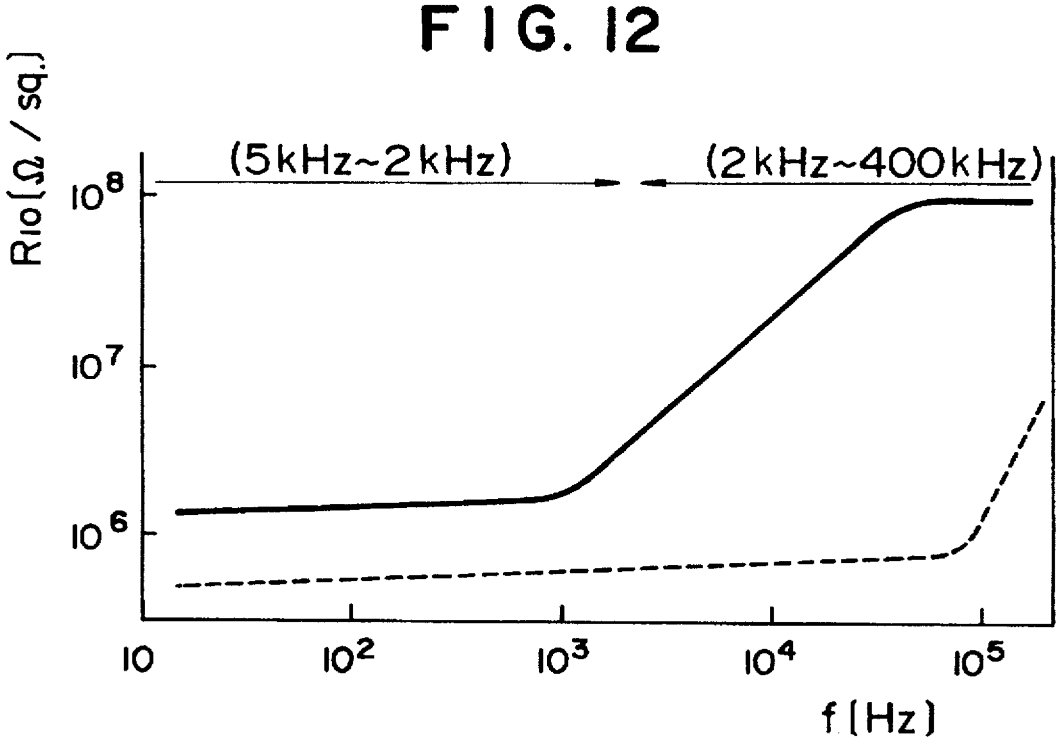
FIG. 12 is a characteristic diagram of a frequency vs. a resistance value of a transparent conductive coating.

On the other hand, an alternating electric field ELEF 200 in a frequency band of 5 Hz to 2 kHz is caused to be generated with ΔHV that is high voltage dynamic voltage fluctuation shown in FIG. 3C, being different from the alternating electric field VLEF described previously. According to the present invention, a transparent conductive coating 10 with a resistance value set at the optimum is provided on the surface of the face plate 3 of the cathode-ray tube 1 in order to control the alternating electric field ELEF 200. Those in which particles of indium oxide or tin oxide are dispersed are used as the material of the transparent conductive film. Furthermore, a thin coating (not illustrated in FIG. 3A) of silicon oxide is formed on the surface of the transparent conductive coating 10, thus adding a function as an anti-reflection coating. FIG. 11 shows the result of measuring the relationship between the resistance value (unit [Ω/sq.]) per unit area of the transparent conductive coating 10 and the alternating electric field ELEF at a distance of 30 [cm] in the front of the cathode-ray tube display unit 1. In order to achieve a regulated value (≦10 [V/m], the distance at 30 cm in the front) of ELEF of the TCO guide line, it is sufficient to make the resistance value of the transparent electrode to $2\times10^6$ [Ω/sq.] or less. FIG. 12 shows frequency characteristics of a resistance value of a general transparent conductive coating. A transparent conductive coating of high production cost has small resistance values in the frequency areas of two types of alternating electric fields ELEF and VLEF, and can shield two types of alternating electric fields sufficiently. However, the cost of this transparent conductive coating is high and has been used only for a part of high-grade types. However, although a transparent conductive coating of low production cost has a small resistance value in the frequency area of the ELEF band, it has a drawback that the resistance value is increased when the frequency is increased and the shielding effect of the alternating electric field VLEF is decreased. It has been confirmed that, adapting this result of measurement, a method of using an inexpensive transparent conductive coating, controlling the ELEF by means of shielding action of the transparent conductive coating and using jointly a system of controlling VLEF by supplying a reverse pulse to the funnel electrode in the VLEF band where the shielding effect is decreased is also advantageous economically.

FIG. 13 shows another embodiment in which alternating voltage generated in an interior conductive coating is canceled. In the present embodiment, the reverse pulse voltage is applied by superimposing on high voltage.

The deflection yoke 6 is provided with a horizontal deflection coil 62 and a vertical deflection coil 61 for generating deflection magnetic fields for obtaining a raster by deflecting an electron beam in a horizontal and a vertical directions. (Besides, the details of the horizontal and vertical deflection coils are omitted in view of illustration circumstances). The horizontal deflection coil 62 is connected to the horizontal deflection circuit 50, and pulse voltage $V_0$ that repeats at the horizontal period is applied thereto.

Figure 14:
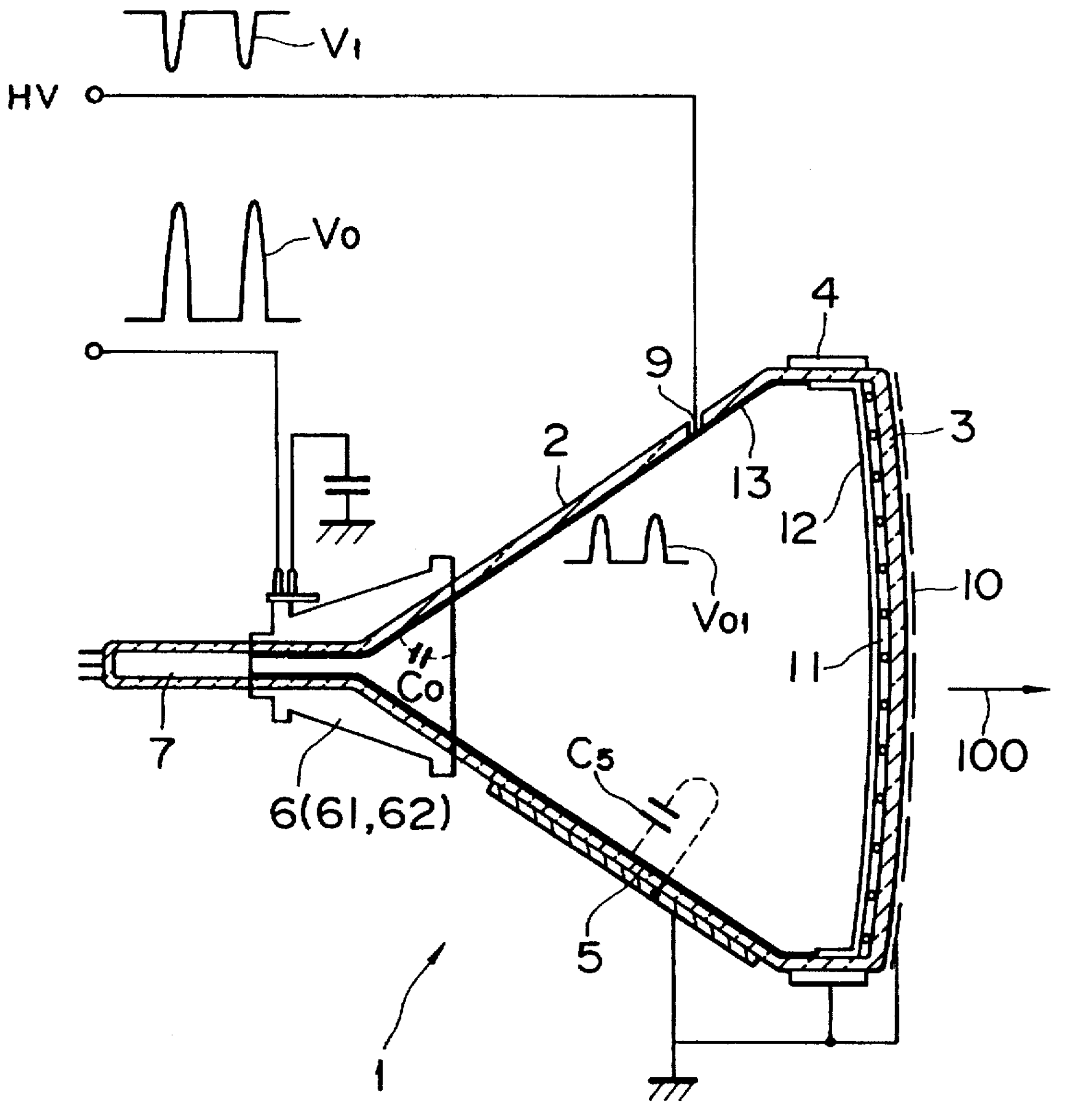
FIG. 14 is a sectional block diagram showing another embodiment of a cathode-ray tube display unit according to the present invention.

A high voltage transformer 20 boosts a pulse applied to a primary coil 21 from a high voltage circuit 51 with a secondary coil 22. The boosted pulse is rectified with a diode 23 and smoothed by a capacitor $C_2$, and outputs DC voltage at several ten thousands V at a high voltage terminal $T_4$. As shown in FIG. 14, an inner layer conductive coating 13 obtained by applying conductive graphite is formed on an internal surface of a glass vessel of a funnel portion 2, and high voltage (HV) from the high voltage terminal $T_4$ is applied thereto through an anode button 9. On the other hand, a phosphor that emits light by irradiation with an electron beam is applied to the internal face of a face plate 3 so as to form a fluorescent film 11 thereon, and a metal-back film 12 deposited with aluminum and an interior conductive coating 13 are connected electrically to each other so that high voltage is applied to the fluorescent film 11.

The exterior graphite coating 5 is composed of that in which an aqueous solution of graphite that is an electrical conductor is applied to a part of the external wall of the glass vessel of the funnel portion 2 and dried, and this exterior graphite coating 5 is connected electrically with ground thereby to add electrostatic capacity to the anode of the cathode-ray tube 1. Namely, the exterior graphite coating 5 connected to ground forms electrostatic capacity (exterior capacity) $C_5$ between the exterior graphite coating 5 and the interior conductive coating 13 through the funnel glass. Since this electrostatic capacity $C_5$ is connected in parallel with a smoothing capacitor $C_2$ of the high voltage transformer 20, it has a function of reducing fluctuation (ripple) of high voltage (HV) outputted from the high voltage terminal $T_4$.

The horizontal deflection coil 62 of the deflection yoke 6 and the interior conductive coating 13 are opposed to each other through glass having a thickness of approximately 2 mm. Thus, as shown with electrostatic capacity $C_0$ in FIG. 14, a pulse $V_{01}$ analogous to a flyback pulse $V_0$ applied to the horizontal deflection coil 62 is generated in the interior conductive coating 13 as shown in FIG. 3B. The amplitude of this pulse $V_{01}$ is determined being proportioned to a product of electrostatic capacity $C_0$ between the horizontal deflection coil 62 and the interior conductive coating 13 and the amplitude of the flyback pulse $V_0$, and inversely proportioned to the sum of the high voltage smoothing capacitor $C_2$ and the exterior capacitor $C_5$. It is expressed by Expression 6 as follows.

[Expression 6]

$$V_{01} \propto \frac{C_0 \times V_0}{C_2 + C_5} \qquad \text{[Expression 6]}$$

Then, an alternating electric field VLEF 100 is radiated frontward from the face plate portion 3 by a fact that alternating voltage (pulse $V_{01}$) fluctuating at a horizontal deflection frequency $f_H$ is generated with the metal-back film 12 of the conductive coating and the interior conductive coating 13 as electrodes.

The relationship between the flyback pulse $V_0$ generated in the horizontal deflection coil 62 and the pulse $V_{01}$ generated in the interior conductive coating 13 being caused by the flyback pulse, and the relationship between the reverse pulse $V_1$ with a polarity inverted from that of the flyback pulse $V_0$ and the reverse pulse $V_{11}$ generated in the interior conductive coating 13 by the reverse pulse $V_1$ are the same as that shown in FIG. 3B.

The reverse pulse $V_1$ is a pulse generated in a secondary winding 32 of a transformer 30 connected to the horizontal deflection circuit 50 and the horizontal deflection coil 61, and polarities of $V_0$ and $V_1$ are inverted from each other. The reverse pulse $V_1$ supplied to a terminal 26 of the high voltage transformer 20 is applied to a high voltage terminal $T_4$ through a capacitor 25 contained inside the high voltage transformer 20 and generates a reverse pulse $V_{11}$ in the interior conductive coating 13. One end of the capacitor 25 is connected to the high voltage terminal $T_4$, and the capacitor 25 is contained inside the high voltage transformer 20 from a viewpoint of withstand voltage and safety and used being filled with resin having high insulating property.

The amplitude of the reverse pulse $V_{11}$ is determined depending on the number of windings of the secondary winding 32 of the transformer 30 and an electrostatic capacity value of the capacitor 25 contained inside the high voltage transformer 20. When the pulse $V_{01}$ and the reverse pulse $V_{11}$ generated in the interior conductive coating 13 are set so that absolute values thereof become almost equal to each other, the pulse $V_{01}$ and the reverse pulse $V_{11}$ negate each other, thus making it possible to make the amplitude of the alternating voltage generated in the interior conductive coating 13 almost zero. Thus, it is possible to reduce the alternating electric field VLEF 100 radiated frontward from the face plate portion 3 of the cathode-ray tube 1 by a large margin.

In a 17-inch type highly precise display (a highly precise cathode-ray tube display unit) for instance, a pulse $V_{01}$ of approximately 10 $V_{p-p}$ has been generated in the interior conductive coating 13 by means of a flyback pulse $V_0$ of 1000 $V_{p-p}$. Thus, a reverse pulse $V_1$ of −220 $V_{p-p}$ was supplied through a capacitor 25 having electrostatic capacity of 150 pF. Then, an alternating electric field measuring instrument (such as EFM 200 manufactured by Combinova Company in Sweden) is arranged at a distance of 30 cm from the front of the cathode-ray tube 1, and it has been confirmed that VLEF that was 7 V/m before the countermeasure can be improved to 0.6 V/m through actual survey and VLEF has been improved to a level that it can be made to a TCO guide line (≦1 V/m) or below and influence by unwanted radiation electric field on human bodies offers no problem. Here, when it is assumed that the capacity of the capacitor 25 to which the reverse pulse voltage $V_1$ is applied is $C_{25}$, $(V_0 \times C_0) > (V_1 \times C_{25})$ is obtained. When it is assumed that $K \times V_0 \times C_0 = V_1 \times C_{25}$, $0.1 \leqq K \leqq 0.9$ is obtained. $C_{25}$ corresponds to the electrostatic capacity $C_1$ shown in FIG. 3A, and the Expression 3 is also effected in the present embodiment.

FIG. 15 shows another embodiment of the present invention. One end of a primary winding of the transformer 30 is connected to the power source in FIG. 13, but it is connected to reference potential (GND) through a capacitor in FIG. 15. The horizontal deflection circuit 50 is connected to the power source through an inductance 44, and energy is supplied thereto. Further, a primary coil 41 of a transformer 40 is connected to a horizontal deflection coil 62, and a reverse pulse $V_1$ with a polarity inverted from that of a flyback pulse $V_0$ generated in the primary coil 41 is generated in a secondary coil 42 of the transformer 40.

This reverse pulse $V_1$ is supplied to a terminal 26 of a high voltage transformer 20 and negates the pulse $V_{01}$ in the interior conductive coating 13, thereby to reduce the alternating electric field VLEF 100.

Figure 16:
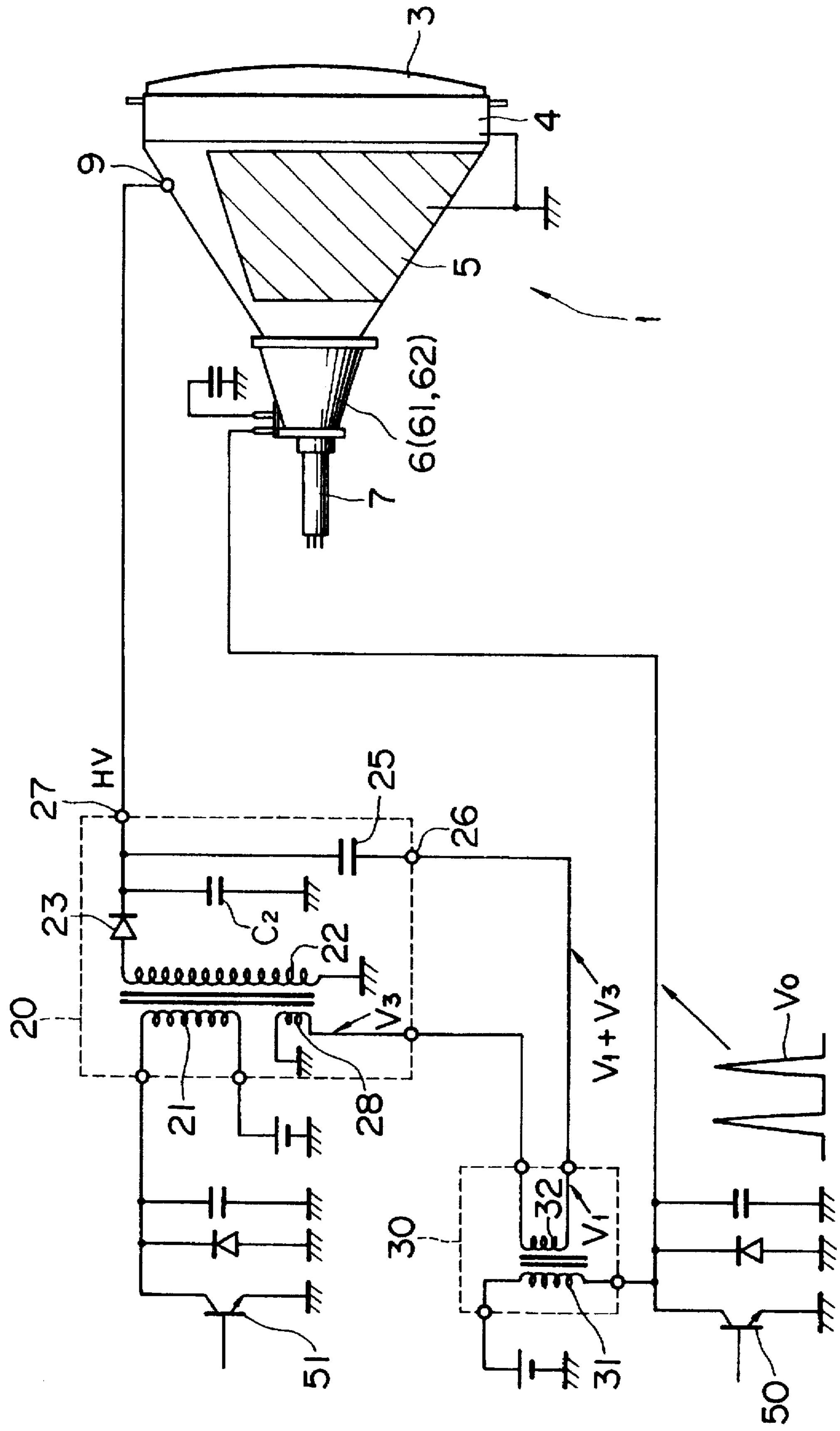
FIG. 16 is a diagram showing still another embodiment of a reverse pulse voltage generating circuit according to the present invention.

FIG. 16 shows another embodiment of the present invention. In general, a high voltage circuit 51 is operated with a video synchronizing signal as reference, and the pulse boosted in the secondary winding 22 of the high voltage transformer 20 cannot be smoothed completely, but the ripple (voltage fluctuation) thereof remains at an output terminal 27. In the present embodiment, the influence by the fluctuating portion is canceled. In the present embodiment, a second reverse pulse $V_3$ obtained from an auxiliary winding 28 provided in the high voltage transformer 20 is superimposed on the first reverse pulse $V_1$ obtained from the secondary coil 32 of the transformer 30 described with reference to FIG. 13 or from the secondary coil 42 of the transformer 40 described with reference to FIG. 15. Further, a reverse pulse $(V_1+V_3)$ obtained by adding and synthesizing these two reverse pulses $V_1$ and $V_3$ is supplied to a terminal 26 connected to one end of a capacitor 25 so as to obtain a reverse pulse $(V_{11}+V_{31})$ that cancels the alternating voltage generated in the interior conductive coating 13.

In this case, $(V_0 \times C_0) > ((V_1+V_3) \times C_{25})$ is satisfied.

Figure 17A:
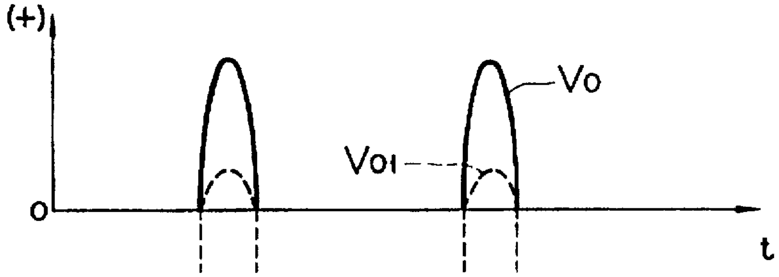
FIGS. 17A to 17F are explanatory diagrams for explaining the principle of the embodiment shown in FIG. 16.
Figure 17B:
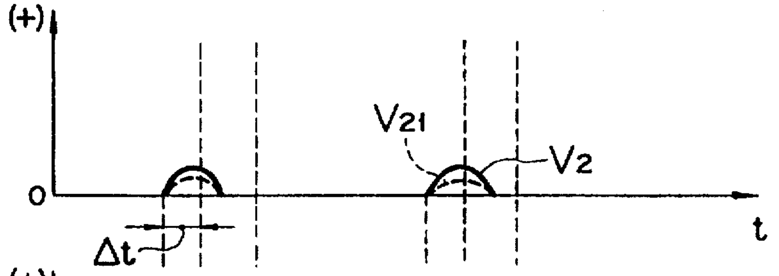
Figure 17C:
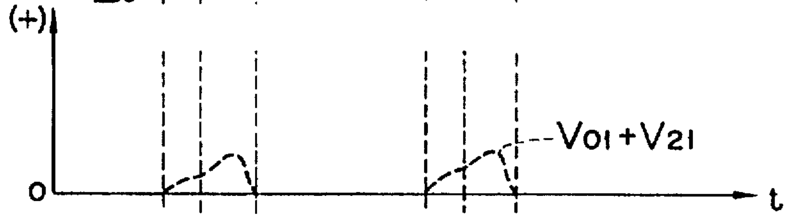
Figure 17D:
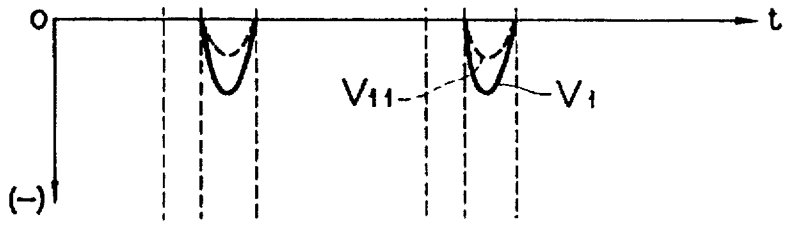
Figure 17E:
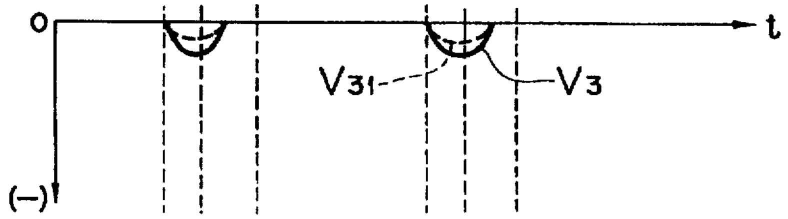
Figure 17F:
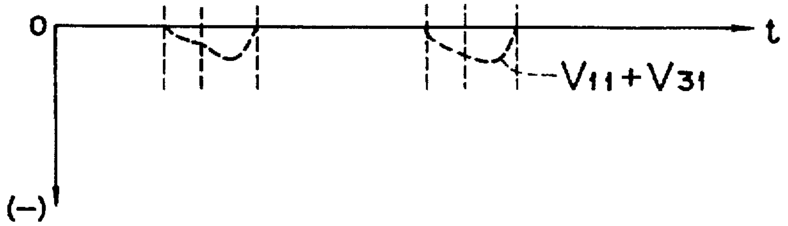

Next, the reason why the second reverse pulse $V_3$ is superimposed on the first reverse pulse $V_1$ will be explained with reference to FIGS. 17A, 17B, 17C, 17D, 17E and 17F. FIG. 17A shows a flyback pulse $V_0$ and a pulse $V_{01}$ generated in the interior conductive coating 13, and FIG. 17B shows AC components generated in the high voltage transformer 20 and shows a residual pulse $V_2$ remaining on a high voltage line generated during a flyback period and a pulse $V_{21}$ generated in the interior conductive coating 13 being caused by $V_2$. The flyback pulse $V_0$ and the residual pulse $V_2$ generated in the horizontal deflection circuit 50 and the high voltage circuit 51 have phases different by $\Delta t$ (approximately several $\mu$ seconds). As a result, as shown in FIG. 17C, the alternating voltage generated in the interior conductive coating 13 becomes voltage $(V_{01}+V_{21})$ obtained by adding pulses $V_{01}$ and $V_{21}$ to each other. Thus, the first reverse pulse $V_1$ and the second pulse $V_3$ shown in FIGS. 17D and 17E are added to each other so as to obtain a reverse pulse $(V_{11}+V_{31})$ shown in FIG. 17F in the interior conductive coating 13, thus making it possible to negate the pulse $(V_{01}+V_{21})$ with each other and to reduce the alternating electric field VLEF 100 to almost zero.

Figure 18:
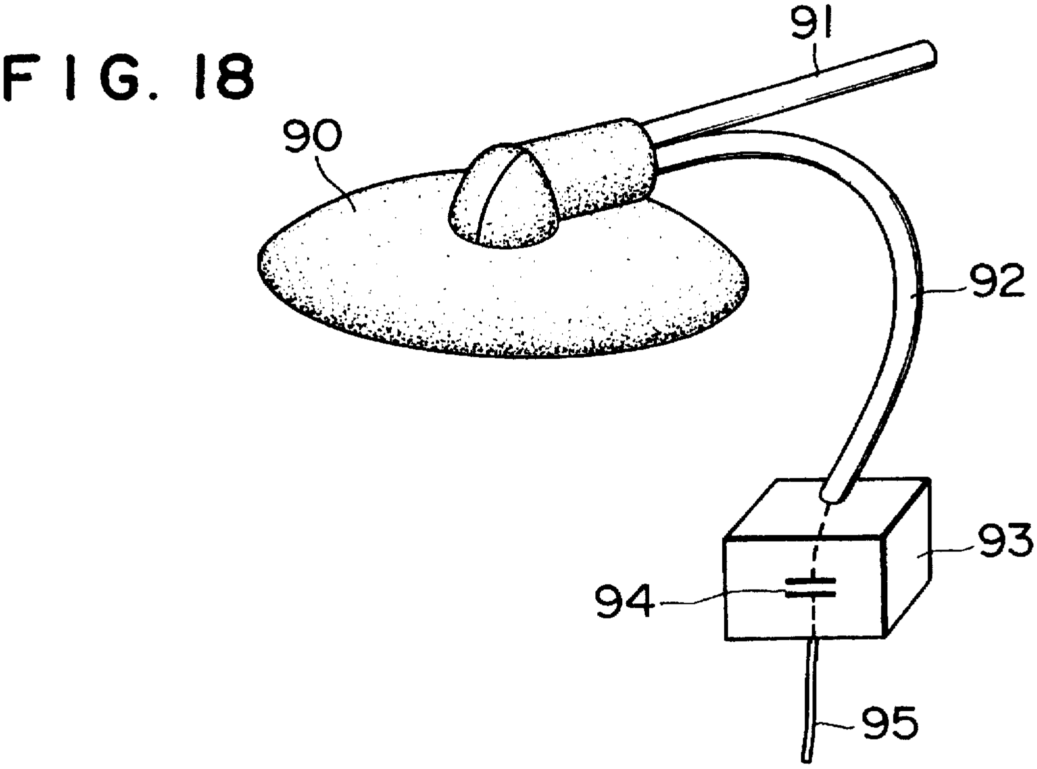
FIG. 18 is a view showing another embodiment of a reverse pulse voltage applying circuit.

FIG. 18 shows a structure for supplying a reverse pulse to the interior conductive coating 13 in a cathode-ray tube display unit according to another embodiment of the present invention. As shown in FIG. 18, a first anode cable 91 for applying high voltage (HV) from the high voltage transformer 20 to the cathode-ray tube 1 is connected to one end of a second anode cable 92 inside an anode cap 90 composed of an elastic insulator, and another end of the anode cable 92 is connected to one end of a capacitor 94. It is structured so that the capacitor 94 is housed in a vessel 93 made of resin, resin of high withstand voltage property is filled in the vessel 93, and another end of the capacitor 94 is connected to an electric cable 95. The function of the capacitor 94 is similar to that of the capacitor 25 in respective embodiments described above. Hence, the description thereof is omitted.

Figure 19:
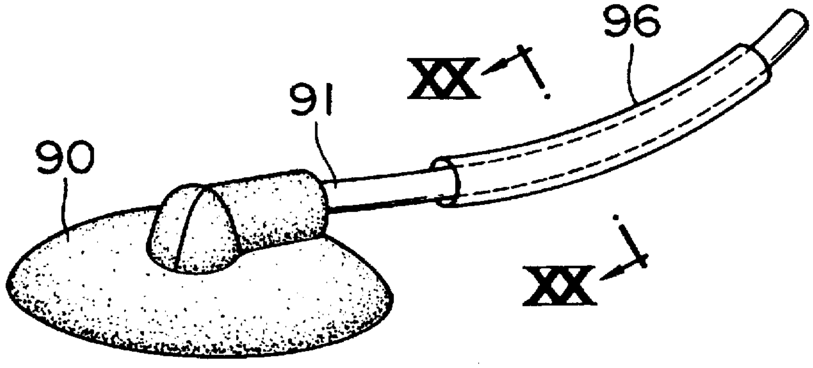
FIG. 19 is a view showing still another embodiment of a reverse pulse voltage applying circuit.
Figure 20:
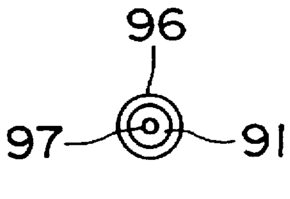
FIG. 20 is a sectional view taken along XX—XX in FIG. 19.

FIG. 19 shows another structure for supplying a reverse pulse to the interior conductive coating 13, FIG. 19 is a perspective view showing an anode cable and an anode cap and FIG. 20 is a sectional view taken along a line XX—XX of the anode cable shown in FIG. 19. The present embodiment has such a structure that a conductor 96 having a predetermined length is arranged almost coaxially with a core line 97 to which high voltage (HV) is applied on a circumferential portion of the anode cable 91 from the high voltage transformer 20.

According to the present embodiment, there is provided electrostatic capacity (not illustrated) between the circumferential conductor 96 and the core line 97, and, when the pulse $V_1$ or the reverse pulse $(V_1+V_3)$ obtained in respective embodiments is applied to the circumferential conductor 96, a reverse pulse $V_{11}$ or a reverse pulse $(V_{11}+V_{31})$ can be obtained in the interior conductive coating 13 of the cathode-ray tube 1 by the electrostatic capacity. With this, it is possible to reduce the amplitude of the alternating voltage generated in the interior conductive coating 13 and to reduce the alternating electric field VLEF 100 similarly to respective embodiments described above.

Besides, the reverse pulse $V_1$ may be inputted to the terminal 26 shown in FIG. 13 using that which has been obtained from the auxiliary winding 64 shown in FIG. 9A or that which has been obtained from the circuit shown in FIG. 10 or may be applied using structures shown in FIGS. 18 and 19.

The present invention is not limited to the above-mentioned embodiments, but various modifications and equivalent units within the scope of claims are all included in the present invention.

We claim:

1. A cathode-ray tube display unit comprising:

voltage supplying means for supplying at least a high voltage to an anode of a cathode-ray tube;

deflection yoke means having a horizontal deflection coil and a vertical deflection coil;

an interior conductive coating formed on the inside of a glass vessel of said cathode-ray tube;

a conductive film electrode formed on an external wall surface of the glass vessel of a funnel portion of the cathode-ray tube, said conductive film electrode being electrically separated from an exterior graphite coating formed on an external wall surface of said cathode-ray tube, said exterior graphite coating being electrically connected to ground; and means connected to said conductive film electrode for generating a reverse pulse voltage $V_1$ having a polarity reverse to that of a voltage generated in said interior conductive coating due to an electrostatic coupling generated by a flyback pulse voltage $V_0$ supplied to said deflection yoke means, wherein a value of said reverse pulse voltage $V_1$ is set so that an equation $V_{01}-V_{11} \approx 0$ is satisfied, where $V_{01}$ is a first alternating voltage proportional to a product $(V_0 \times C_0)$, $C_0$ is an electrostatic capacity between said horizontal deflection coil and said interior conductive coating, $V_{11}$ is a second alternating voltage proportional to a product $(V_1 \times C_1)$, and $C_1$ is an electrostatic capacity between said conductive film electrode and said interior conductive coating means.

2. A cathode-ray tube display unit according to claim 1, wherein said means for generating the reverse pulse voltage includes:

means for detecting a flyback pulse generated in said horizontal deflection coil; and means for attenuating and inverting said detected flyback pulse so as to obtain the reverse pulse voltage.

3. A cathode-ray tube display unit according to claim 1, wherein a thickness of glass of the glass vessel at a portion adjacent said horizontal deflection coil is formed thicker than other portions of the cathode-ray tube so as to reduce said electrostatic capacity $C_0$.

4. A cathode-ray tube display unit according to claim 1, wherein said interior conductive coating is formed in a predetermined area of the glass vessel so as to reduce said electrostatic capacity $C_0$.

5. A cathode-ray tube display unit according to claim 1, wherein a dielectric constant of a glass material of a portion of the glass vessel adjacent said horizontal deflection coil is set to 8 or below so as to reduce said electrostatic capacity $C_0$.

6. A cathode-ray tube display unit according to claim 1, wherein, a relationship of $0.5 \leqq (C_1/C_0) \leqq 15$ is satisfied.

7. A cathode-ray tube display unit according to claim 1, further comprising a transparent conductive coating formed on an external surface of a face plate of said cathode-ray tube and connected to ground.

8. A cathode-ray tube display unit according to claim 7, wherein said transparent conductive coating includes a resistance having a resistance value per unit area at $2\times10^6$ [Ω/square] or below.

9. A cathode-ray tube display unit according to claim 1, wherein said means for generating the reverse pulse voltage includes means for obtaining reverse pulse voltage from an auxiliary winding provided on a core of said deflection yoke.

10. A cathode-ray tube display unit comprising:

voltage supplying means for supplying at least a high voltage to an anode of a cathode-ray tube;

deflection yoke means having a horizontal deflection coil and a vertical deflection coil;

an interior conductive coating formed on the inside of a glass vessel of said cathode-ray tube;

a conductive film electrode, formed on an external wall surface of the glass vessel of a funnel portion of the cathode-ray tube, said conductive film electrode being electrically separated from an exterior graphite coating formed on an external wall surface of said cathode-ray tube, said exterior graphite coating being electrically connected to ground; and means connected to said conductive film electrode for generating a reverse pulse voltage $V_1$ having a polarity reverse to that of a voltage generated in said interior conductive coating due to an electrostatic coupling generated by a flyback pulse voltage $V_0$ to said deflection yoke means;

wherein a value of said reverse pulse voltage $V_1$ is set so that an equation $V_{01}-V_{11}\approx0$ is satisfied, where $V_{01}$ is a first alternating voltage proportional to a product $(V_0\times C_0)$, $C_0$ is an electrostatic capacity between said horizontal deflection coil and said interior conductive coating, $V_{11}$ is a second alternating voltage proportional to a product $(V_1\times C_1)$, and $C_1$ is an electrostatic capacity between said conductive film electrode and said interior conductive coating; and wherein an intensity of a very low frequency electric field (VLEF) is decreased to a value no greater than 1 (V/m) at a distance of about 30 cm from and in front of a front surface of said cathode-ray tube.

11. A cathode-ray tube display unit comprising:

voltage supplying means for supplying high voltage to an anode of a cathode-ray tube;

deflection yoke means having a horizontal deflection coil and a vertical deflection coil;

an interior conductive coating formed on the inside of a glass vessel of said cathode-ray tube;

a conductive film electrode formed on an external wall surface of a glass vessel of a funnel portion of the cathode-ray tube, said conductive film electrode being electrically separated from an exterior graphite coating formed on an external wall surface of said cathode-ray tube, said exterior graphite coating being electrically connected to ground; and means for generating a first reverse pulse voltage $V_1$ having a polarity reverse to that of voltage generated in said interior conductive coating due to an electrostatic coupling generated by a flyback pulse voltage $V_0$ supplied to said deflection yoke means;

means for generating a second reverse pulse voltage $V_3$ having a polarity inverted from that of A.C. components generated at an output of said voltage supplying means;

means for adding said first reverse pulse voltage $V_1$ and said second reverse pulse voltage $V_3$ to each other; and means for supplying an output of said adding means to said conductive film electrode, wherein an electrostatic capacity between said horizontal deflection coil and said interior conductive coating means is $C_0$ and an electrostatic capacity between said conductive film electrode and said interior conductive coating is $C_1$, and the relationship $(V_0\times C_0)>((V_1+V_3)\times C_1)$ is satisfied.

12. A cathode-ray tube display unit comprising:

high voltage transformer means for supplying at least a high voltage to an anode of a cathode-ray tube;

deflection yoke means having a horizontal deflection coil and a vertical deflection coil;

an interior conductive coating formed on the inside of a glass vessel of said cathode-ray tube;

means for generating a first reverse pulse voltage having a polarity inverted from that of flyback pulse voltage generated in said horizontal deflection coil;

means for supplying said first reverse pulse voltage to said interior conductive coating through an electrostatic capacity;

means for generating a second reverse pulse voltage having a polarity inverted from that of A.C. components generated at an output terminal of said high voltage transformer means;

means for adding said first reverse pulse voltage and said second reverse pulse voltage to each other; and means for supplying an output of said adding means to said interior conductive coating through the electrostatic capacity.

13. A cathode-ray tube display unit according to claim 12, wherein said means for generating the first reverse pulse voltage includes:

means for detecting the flyback pulse generated in said horizontal deflection coil; and means for attenuating and inverting said detected flyback pulse so as to obtain the first reverse pulse voltage.

14. A cathode-ray tube display unit according to claim 12, wherein said means for generating at least one of the first and second reverse pulse voltage includes transformer means in which a primary winding thereof is connected to said horizontal deflection coil and at least one of the first and second reverse pulse voltage is obtained from a secondary winding.

15. A cathode-ray tube display unit according to claim 12, wherein means for generating at least one of the first and second reverse pulse voltage includes means for obtaining at least one of the first and second reverse pulse voltage from an auxiliary winding provided on a core of said deflection yoke.

16. A cathode-ray tube display unit according to claim 12, wherein said means for supplying the first reverse pulse voltage includes means for applying said first reverse pulse voltage through a capacitor connected at one end output terminal of said high voltage transformer means at one end thereof.

17. A cathode-ray tube display unit according to claim 12, wherein said means for supplying the first reverse pulse voltage includes means for applying said first reverse pulse voltage through a capacitor connected at one end thereof to an anode button portion for leading high voltage from said high voltage transformer means to an anode of a cathode-ray tube.

18. A cathode-ray tube display unit according to claim 12, wherein said means for supplying the first reverse pulse voltage includes means for applying said first reverse pulse voltage through a conductor provided coaxially around an anode cable for leading high voltage from said high voltage transformer means to an anode of a cathode-ray tube.

19. A cathode-ray tube display unit according to claim 12, further comprising a transparent conductive coating formed on an external surface of a face plate of said cathode-ray tube and connected to ground and having a resistance value per unit area at $2\times10^6$ [Ω/square] or below.

* * * * *